United States Patent
Mueller

(10) Patent No.: US 10,089,374 B2
(45) Date of Patent: Oct. 2, 2018

(54) META MODEL DRIVEN DATA BASE REPLICATION AND SYNCHRONIZATION

(75) Inventor: Elisabeth Mueller, Mainz (DE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 621 days.

(21) Appl. No.: 14/402,715

(22) PCT Filed: Jul. 13, 2012

(86) PCT No.: PCT/EP2012/063792
§ 371 (c)(1),
(2), (4) Date: Nov. 21, 2014

(87) PCT Pub. No.: WO2013/174452
PCT Pub. Date: Nov. 28, 2013

(65) Prior Publication Data
US 2015/0142734 A1     May 21, 2015

Related U.S. Application Data

(60) Provisional application No. 61/651,065, filed on May 24, 2012.

(51) Int. Cl.
*G06F 7/00* (2006.01)
*G06F 17/30* (2006.01)

(52) U.S. Cl.
CPC .. *G06F 17/30575* (2013.01); *G06F 17/30563* (2013.01); *G06F 17/30566* (2013.01); *G06F 17/30569* (2013.01)

(58) Field of Classification Search
None
See application file for complete search history.

(56) References Cited

U.S. PATENT DOCUMENTS 7,062,502 B1 *  6/2006  Kesler ................. G06F 17/3056
7,383,285 B1 *  6/2008  Pal ..................... G06F 17/30607
(Continued)

OTHER PUBLICATIONS

Hohenstein, U., "Supporting Data Migration Between Relational and Object-Oriented Databases Using a Federation Approach", Database Engineering and Applications Symposium, 2000 International Sep. 18-20, 2000, Piscataway, NJ, USA, IEEE, Sep. 18, 2000, pp. 371-379, XP010519045.
(Continued)

*Primary Examiner* — Thu Nga Nguyen
(74) *Attorney, Agent, or Firm* — Patent Portfolio Builders, PLLC

(57) ABSTRACT

The present invention relates to a method of executing an export process for an automated meta model driven export of entity parts from a source data base (10), wherein the meta model specifies an abstract model of the source data base (10) and comprises a description of an entity part and/or a reference relationship between entity parts being resolvable from a referencing entity part to a referenced entity part. The method comprising the steps identifying (S14) a set of entity parts being identifiable outside the source data base (10) by a public key, an internal key, or a mixture of a public key and an internal key as first level entity parts, supplementing (S16) the set of first level entity parts by a set of second level entity parts being referenced by the first level parts according to at least one reference relationship described in the meta model, and writing (S18) export data for the set of first level parts and the set of second level parts into an export file. The present invention also relates to a method of executing an import process for an automated meta model driven import of entity parts from a source data base (10) to a target data base (12).

23 Claims, 15 Drawing Sheets

(56) References Cited

U.S. PATENT DOCUMENTS

| | | | |
|---|---|---|---|
| 2007/0226678 A1* | 9/2007 | Li | G06Q 10/10 717/101 |
| 2011/0093514 A1 | 4/2011 | Brown et al. | |
| 2011/0119288 A1* | 5/2011 | Sinha | G06F 17/30306 707/769 |
| 2012/0131073 A1* | 5/2012 | Olney | G06F 17/2785 707/822 |
| 2012/0166405 A1* | 6/2012 | Barbian | G06F 8/65 707/694 |
| 2012/0215766 A1* | 8/2012 | Gorelik | G06F 17/30554 707/722 |
| 2013/0136253 A1* | 5/2013 | Liberman Ben-Ami | H04M 3/5191 379/265.09 |

OTHER PUBLICATIONS

Hohenstein, U., "Using Semantic Enrichment to Provide Interoperability Between Relational and ODMG Databases", International Hong Kong Computer Society Database Workshop, Jan. 1, 1996, pp. 210-232, XP009169683.

Samos, J., et al., "Database Architecture for Data Warehousing: An Evolutionary Approach", In: "Database and Expert Systems Applications", Jan. 1, 1998, Springer-Verlag, Berlin/Heidelberg, 11 pages, XP055060470.

\* cited by examiner

META MODEL DRIVEN DATA BASE REPLICATION AND SYNCHRONIZATION

CROSS-REFERENCE TO RELATED APPLICATIONS

This application is a 35 U.S.C. § 371 National Phase Entry Application from PCT/EP2012/063792, filed Jul. 13, 2012, and designating the United States, which claims priority to U.S. Provisional Application No. 61/651,065, filed May 24, 2012. The above-identified applications are incorporated by reference in their entirety.

TECHNICAL FIELD

The present invention relates to meta model driven data base replication and synchronization between a source data base and a target data base.

BACKGROUND

In the area of database management often databases are operated to support a business process. Here, the term entity part describes something which is of interest and importance to an operation process of a company. Entity parts are characterized by attributes and participate in relationships with other entity parts. An attribute is a fact that describes an entity part. Further, a relationship is an association two entity parts or between an entity part and itself.

Entity parts of a data base are identified by keys which can be single attributes or a combination of attributes. Keys published to external systems are denoted as public keys while keys used locally within applications respectively operative support systems are denoted as internal keys.

Quite often entity parts are stored in relational data bases. Applications are acting on these entity parts and maintain them in order to meet process requirements.

For different operative processes it becomes necessary to
transport all or a subset of related business entity parts to other data bases;
export them to external systems; and/or
import them from external systems.

For these operative processes, a so-called ETL tool or equivalently an extract-transport-load tool has been developed. For any kind of export/import task it is mandatory to transport a set of data, which is either complete in the sense that all references are contained in the set, or which can be completed in the target data base by resolving relationships.

Resolving relationships requires rules for identifying entity parts and references to other entity parts in a generic way.

For this purpose a meta model approach has been introduced. A meta model describes concrete entity parts with their identifiers and properties mapped to data base tables and columns. It also describes referential relations between the entity parts.

A meta model may be written, e.g., in XML and then complies to a specific XML schema. The schema introduces the necessary elements to describe entity parts and their relations. The most important of these elements is the entity part, also referenced ep in the following. An entity part has a name and consists out of a collection of attributes. Some of these attributes are flagged as identifiers or keys.

One entity part maps to one table or a subset of rows of one table located in a relational data base.

An entity synchronization handler ESH tool has been developed which implements some basic import and export functionality for entity parts stored in a relational data base.

The ESH tool allows to extract sets of related entity parts from a relational data base, starting from one or more root entity parts and following the relationships as described in the meta model. Relationships will be followed iteratively. The iteration will be executed only once in case the relationship is classified as "referencing" which automatically implies 1:1. The iteration will be executed "unlimited" if the relationship is classified as child relationship which automatically implies 1:*. The export file generated has XML format as well.

Prerequisite is that the data base tables and rows listed in the meta-model file are available the respective source data base.

On the other hand data files complying with a certain meta model can be imported into a relational data base, provided the database tables and rows listed in the meta-model file are available in the respective target data base.

The rules and relationships described in the meta-model have to be fulfilled on import as well. First of all, it has to be determined, whether an entity part already exists in the target data base. If an entity part already exists in the target data base, either the import is skipped or the entity part is updated with the attributes contained in the import file.

In case a whole set of related entity parts is imported, an identification process has to be executed each of the entity parts contained in the set. Internal keys generated for new objects or retrieved from existing objects to be updated have to be propagated following the relationships described in the meta-model.

If a relation between entity parts is classified to be "referential", any meta-model driven tool has to identify the referenced object either from the import file or from the target data base.

If a relation between business entities is classified to be "child", a meta-model driven tool must try to import appropriate child entity parts from the import file, which means that it executes an update operation on each child entity part loaded from the import file, which could be found in the data base already and an insert operation on each child entity part which could not be identified in the data base.

One of the common use cases for entity synchronization via meta-model approach is to establish synchronization between test and production data bases. Taking the example of a product catalog with different versions of product offerings the test data base will be used to configure and test new versions of product offerings. After verification these new versions need to be published to production.

Problem with the existing solution is the fact that the relations between the entity parts are not described in a way which allows to extract a network of related entity parts from a source data base and to insert or update this network in a target data base while guaranteeing a consistent correlation between entity parts from source data base to the target data base.

As of today the meta model describes relationships between entity parts. These relationships may be of type referencing 1:1 or parent-child 1:n. Assuming that new versions of an entity part having a parent-child relationship has been exported from a source data base, e.g. a test data base, this new version needs to be imported into the target data base, e.g. a production data base. During this import it has to be assured, that not only the root entity part is updated, but also the set of children entity parts is maintained correctly.

However, the current schema description and algorithm does not allow for a full automatic synchronization.

SUMMARY

In view of the above the object of the present invention is to provide an automized approach to meta model driven data base replication and synchronization.

According to a first aspect of the present invention this object is achieved by a method of executing an export process for an automated meta model driven export of entity parts from a source data base. The meta model specifies an abstract model of the source data base and comprises a description of an entity part and/or a reference relationship between entity parts being resolvable from a referencing entity part to a referenced entity part. The method according to the first aspect of the present invention comprises the step of identifying a set of entity parts being identifiable outside the source data base by a public key, an internal key, or a mixture of a public key and an internal key as first level entity parts, supplementing the set of first level entity parts by a set of second level entity parts being referenced by the first level parts according to at least one reference relationship described in the meta model, and writing export data for the set of first level parts and the set of second level parts into an export file.

According to a second aspect of the present invention the object outlined above is achieved by a method of executing an import process for an automated meta model driven import of entity parts from a source data base to a target data base. Here, the meta model specifies an abstract model of the source data base or the target data base and comprises a description of an entity part and/or a private child reference. The private child reference is resolvable from a parent entity part of the source data base or the target data base which is identifiable outside the source data base or the target data base by a public key. The resolution is to at least one referenced entity part of the source data base or the target data base and is identifiable internally in the source data base or the target data base. Further, the private child reference is used to override a pre-existing aggregation of entity parts in the target data base being referenced from an entity part of the target data base having the same public key as the parent entity part in the source data base. The method according to the second aspect of the present invention comprises the steps of parsing an import file to build an initial graph of entity parts according to the meta model in a repository as staging memory for data import into the target data base, transforming the initial graph in the repository into an import graph of entity parts, and updating the target data base on the basis of the import graph of entity parts. Further, the step of transforming the initial graph in the repository into an import graph of entity parts is executed by repeating the steps of identifying a next entity part in the initial graph being identifiable outside the source data base by a public key as next first level source entity part, searching the target data base for an entity part which has a public key corresponding to the public key of the next first level source entity part as next first level target entity part, deleting entity parts being referenced by the next first level target entity part in the target data base when the referenced entity parts are identifiable internally in the target data base and a private child reference of the meta model indicates that such entity parts are to be deleted in the target data base prior to data import, and completing the next first level target entity part and its referenced entity parts with data from the target data base.

According to a third aspect of the present invention the object outlined above is achieved by an apparatus for executing an export process according to an automated meta model driven export of entity parts from a source data base. The apparatus comprises a meta model administration unit adapted to manage a meta model specifying an abstract model of the source data base and comprising a description of an entity part and/or a reference relationship between entity parts being resolvable from a referencing entity part to a referenced entity part. Further the apparatus comprises an entity part processing unit adapted to identify a set of entity parts being identifiable outside the source data base by a public key, an internal key, or a mixed public and internal key as first level entity parts, a database modeling unit adapted to supplement the set of first level entity parts through a set of second level entity parts being referenced by the first level entity parts according to at least one reference relationship described in the meta model, and an export file generating unit adapted to write export data for the set of first level parts and the set of second level parts into an export file.

According to a fourth aspect of the present invention the object outlined above achieved by an apparatus for executing an import process for an automated meta model driven import of entity parts from a source data base to a target data base. The meta model specifies an abstract model of the source data base or the target data base and comprises a description of an entity part and/or a private child reference being resolvable from a parent entity part of the source data base or the target data base which is identifiable outside the source data base or the target data base by a public key. The resolution is to at least one referenced entity part of the source data base or the target data base and is identifiable internally in the source data base or the target data base. The private child reference is used to override a pre-existing aggregation of entity parts in the target data base being referenced from an entity part of the target data base having a public key corresponding to the public key of the parent entity part in the source data base. The apparatus comprises an import file parsing unit adapted to parse an import file to build an initial graph of entity parts according to the meta model in a repository as staging memory for data import into the target data base. The apparatus also comprises a graph transformation unit adapted to transform the initial graph in the repository into an import graph of entity parts. The graph transformation unit is adapted to repeat the following steps: identify a next entity part in the initial graph being identifiable outside the source data base by a public key as next first level source entity part, search the target data base for an entity part which has a public key corresponding to the public key of the next first level source entity part as next first level target entity part, delete entity parts being referenced by the next first level target entity part in the target data base when the referenced entity parts are identifiable internally in the target data base and a private child reference of the meta model indicates that such entity parts are to be deleted in the target data base prior to data import, complete the next first level target entity part and its referenced entity parts with data from the target data base. Further, the apparatus comprises a data base updating unit adapted to update the target data base on the basis of the import graph of entity parts.

BRIEF DESCRIPTION OF THE DRAWINGS

In the following the present invention will be explained with reference to preferred embodiments thereof and to the drawings in which.

DETAILED DESCRIPTION

Figure 1:
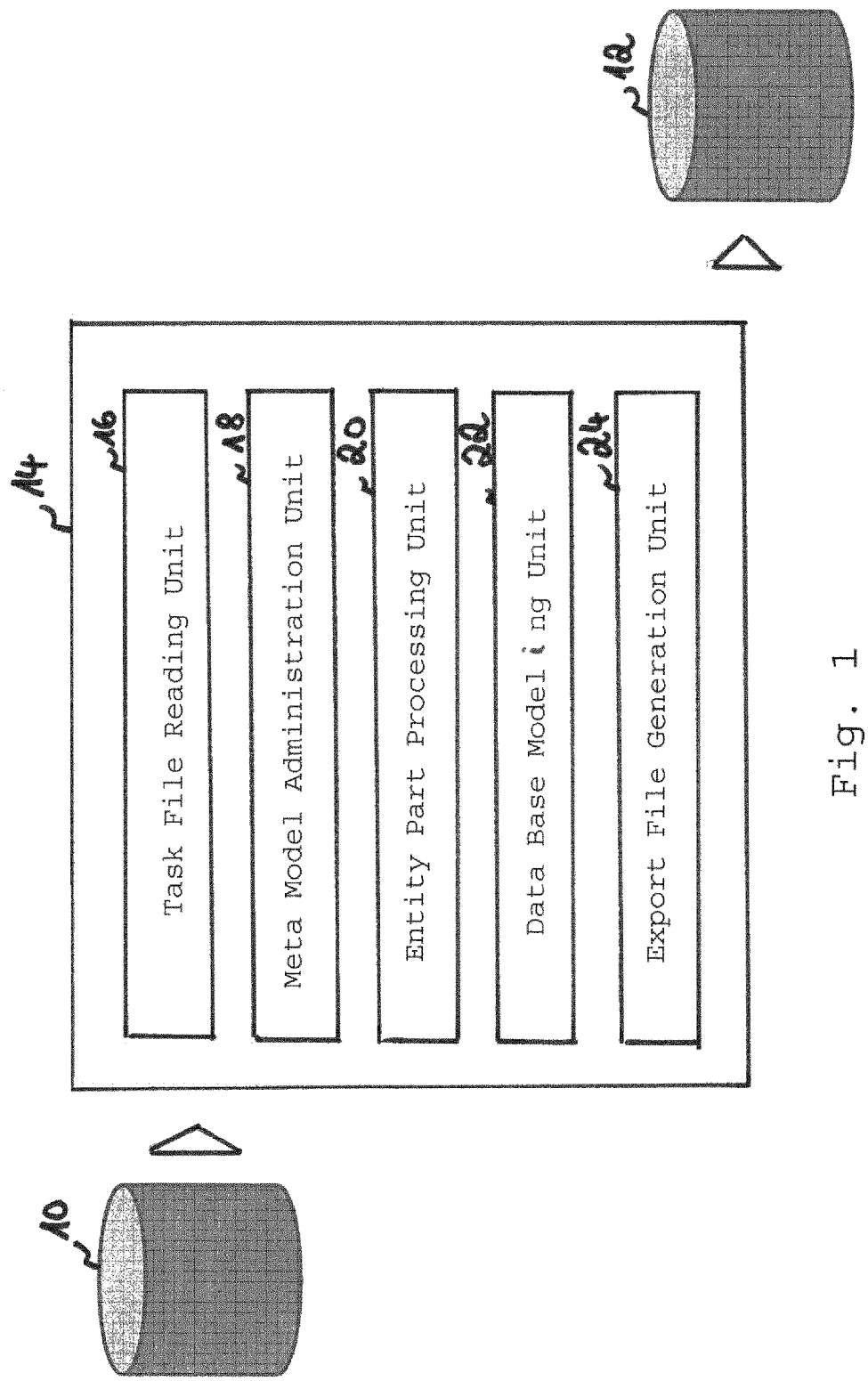
FIG. 1 shows a schematic diagram of an apparatus for executing an export process according to an automated meta model driven export of entity parts from a source data base to an export file.

In the following the best mode for carrying out the present invention will be explained with reference to the drawings. As far as functionality and operations of the present invention are explained it should be understood that such functionality is free implementable in hardware, in software or a combination thereof.

In the following a general outline of the concepts and understandings underlying the present invention will be given.

Entity parts may be identified by public keys, e.g., either single or composite key. These keys never change between data base instances and uniquely identify an object in its domain, not world wide. Public keys can also be understood as external keys of an entity part. A public key is for example an invoice number.

In addition to the public keys an object is identified by an internal key, which is a key local to a data base, e.g. a number generated from a data base sequence.

Not all entity parts have public keys. In general only some "important" entity parts have a public meaning in a broader context, e.g., between various data bases, and therefore are identified by public keys. If a $1^{st}$ level entity part refers to a hierarchy of children, the children not necessarily have public keys.

References between data base entity parts are established using key values. There might be data bases where references between entity parts are established using public keys but this is not the general situation. It has to be assumed that the references between entity parts are established using internal keys only, e.g., just numbers.

One option is that these children have internal keys only and therefore cannot be identified across data bases. These children are then considered as "privately owned" by the $1^{st}$ level entity part up in the hierarchy. An example for this is a collection of conditions concatenated by "AND" operation.

Another option is that they have a combination of identifiers build from a reference to publically identified entity part somewhere in the entity part graph and a key attribute which does not change. An example for this are the items on an invoice. The invoice item number is the attribute of the key which does not change, but the reference to the invoice identified by the invoice number is in general established by the internal number of the invoice. Also the invoice item number is only unique in the context of the dedicated invoice. Such a key is called "mixed", since it is possible to identify the children to the external world by combining the public identification of the referenced parent with the stable key part which is the invoice item number.

If now a entity part is transported to another data base instance, the public key of this entity part will be kept and will be used for identification purposes. It will never change. In contrast the internal key might get recalculated depending on the key generation logic of the target data base.

In view of the above the contributions of the present invention are twofold:

1) The present invention introduces several extensions to the meta-model schema which allows to identify entity parts and specify "parent/child" relationships and ownership of relations by introducing first and second level entity part parts.

2) The present invention introduces a new method that allows to identify first and second level entity parts based on public keys, generate or retrieve internal identifiers and propagate them in the model of related entity parts prior to import of the related entity part into a data base.

The meta model according to the present invention distinguishes between first level entity part parts known to external systems, which are therefore identified by public keys and second level entity part parts only known as "private collection" of children and identified by their relation to the first level entity part parts and the collection type.

According to the present invention a 1:n reference between entity parts can be a relation between first level entity part parts, between first and second level entity parts or between second level entity parts only.

The meta model qualifies the different types of identifiers of an entity part and determines the rules to be applied when a network of entity part parts is transported between data bases.

In the following a general outline of a meta model driven export of data from a source data base will be given.

Any application implementing the meta-model driven export will be instructed to export one or more first level entity part parts as identified by a list of public keys. Such an application needs to retrieve the mentioned entity parts from the source data base. Then it has to evaluate the relations described in the meta model and follow all references and child relationships. It needs to retrieve the complete network of related entity parts according to the rules defined in the meta model. These rules also describe when to "end" the expansion process.

The export file created has a predetermined format, e.g., XML, and contains the payload of first and second level entity part parts, just naming the entity part types, their attributes and values. Identify the first level entity part parts of the network by their public keys, e.g., single keys or composite keys.

The export file containing the data to be transported makes sense only together with an appropriate meta model file describing the contained entity part parts and their relations among each other.

Further to the above, in the following a general outline of a meta model driven import of data into a target data base will be given.

Any application implementing the meta-model driven import has to use a data export file in combination with an associated the meta model file. The tool needs to consider the level of entity parts contained in the import file. For $1^{st}$ level entity parts an insert or update logic has to be implemented while for $2^{nd}$ level entity parts the complete "private" collection has to be inserted respectively exchanged with the new content transported in the data set to be imported.

During the import process the following steps have to be executed:
1) build a repository containing an entity part import graph from the data to be imported according to the description in the meta model;
2) identify the first level entity part parts of the network by their public keys or mixed keys, e.g., single or composite keys and check whether (a subset of) these entity parts is already present in the target data base;
3) identify the second level entity parts of the network and check whether (a subset of) these entity parts is already present in the target data base;
4) retrieve internal identifiers for first level entity parts to be updated and propagate them to the entity parts (first and second level) to be imported;
5) create new internal identifiers for first level entity parts which are not yet available in the target data base and will be inserted and propagate these identifiers to the related entity part parts (first and second level) to be imported;
6) insert or update first level entity parts;
7) exchange collections of second level entity parts already existing in the target data base with the collections contained in the data set to be imported;

According to the present invention an important aspect on import is the public versus private key handling. $1^{st}$ level entity parts are identified by public or mixed keys. If transported between data bases, these entity parts can be uniquely identified in a target data base if they already exist. Thus it is possible to update their attributes with the information contained in the import data file or skip the update if the ETL tool is instructed to do so. If an entity part already exists in the target data base the internal keys of the target object have to be re-used even if the other attributes are updated by the information contained in the import file. These internal keys have to be propagated to potentially imported child entity parts.

For $2^{nd}$ level entity parts (private children) only identified by internal data base keys it is not possible to determine, whether these entity parts already exist in the target data base and have to be updated (conceptually) or whether they do not exist in the target data base yet. Thus there are only two options. Either all entity parts are considered to be new and inserted into the target data base or existing private children are deleted before a new set of private children is inserted.

Here, according to the present invention if entity part synchronization and replication is desired, the parent owning an aggregation (private child relationship) will be flagged such that the aggregation is deleted in the data base before a new set of children is inserted.

Further to the general description of the present invention as outlined above, in the following preferred embodiments will be described with reference to the drawings.

As already explained above, the present invention relates to a meta model driven approach to data base replication and synchronization. In more detail, the present invention relates to a meta model driven approach to data base replication from a source data base 10 to a target data base 12. This allows to achieve a synchronization between the source data base 10 and the target data base 12.

According to the present invention, a meta model at least specifies an abstract model of the source data base 10 or a target data base 12. A meta model comprises at least a description of an entity part of the source data base 10 or the target data base 12 and a reference relationship between entity parts being resolvable from a referencing entity part to a referenced entity part in the source data base 10 or the target data base 12.

Further, according to the present invention the reference relationship the meta model comprises a 1:1 reference being resolvable from a referencing entity part of the source data base 10 or target data base 12 to one referenced entity part of the source data base 10 or the target data base. The meta model also may comprise a 1:n child reference being resolvable from a referencing entity part of the source target data base 10 or the target data base 12 to at least one referenced entity part of the source data base 10 or the target data base 12.

FIG. 1 shows a schematic diagram of an apparatus 14 for executing an export process according to an automated meta model driven export of entity parts from the source data base 10. It the following the apparatus 14 will also be referred to as export apparatus 14 in short.

As shown in FIG. 1, the export apparatus 14 for executing the export process according to the automated meta model driven export of entity parts from the source data base 10 comprises a task file reading unit 16, a meta model administration unit 18, an entity part processing unit 20, a database modeling unit 22, and an export file generation unit 24.

Figure 2:
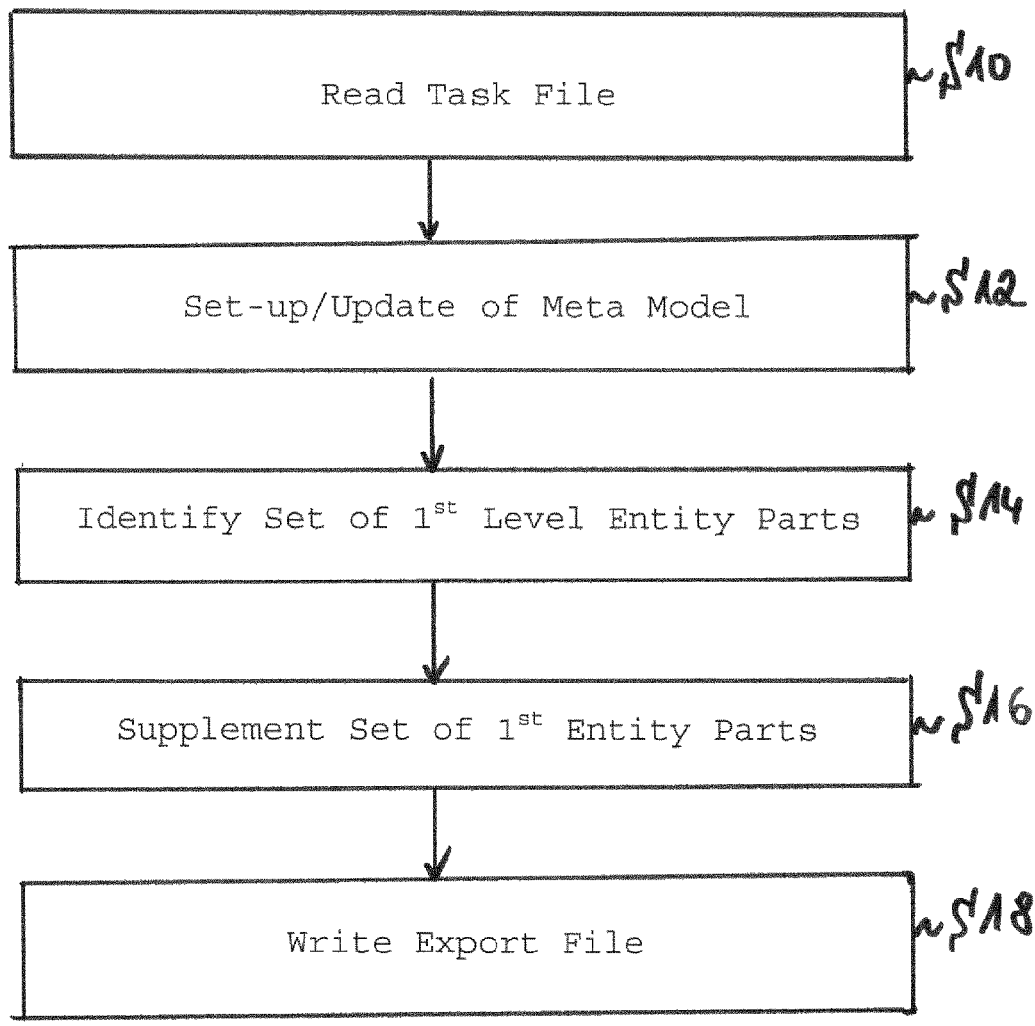
FIG. 2 shows a flow chart of operation for the export apparatus shown in FIG. 1.

FIG. 2 shows a flow chart of operation for the export apparatus 14 shown in FIG. 1.

As shown in FIG. 2, the operation of the export apparatus 14 starts with a step S10, operatively executed by the task file reading unit 16, to read a task file. Here, the task file defines the export process as a list of identifiers, e.g., public identifiers of first level entity parts in the source data base 10 and a reference to a meta model file describing the meta model which is applicable to the export process.

It should be noted that the specification of the export process using a task file is only an option and that any other way to specify the task to the export apparatus 14 is well covered by the present invention.

As shown in FIG. 2, in the operation of the export apparatus 14 there follows a step S12, operatively executed by the meta model administration unit 18, to set-up or update a meta model of the source data base 10 in the export apparatus 14 in line with the reference to the meta model file.

As shown in FIG. 2, in the operation of the export apparatus 14 there follows a step S14, operatively executed by the entity processing unit 20, to identify a set of entity parts being identifiable outside the source data base 10 by a public key as first level entity parts. It should be noted set of entity parts may also be set up with respect to entity parts being identifiable the source data base 10 through internal identifiers or keys or being identifiable the source data base 10 through mixed identifiers, e.g. keys derived form a combination of public keys and private keys.

As shown in FIG. 2, in the operation of the export apparatus 14 there follows a step S16, operatively executed by the data base modeling unit 22, to supplement the set of first level entity parts through a set of second level entity parts being referenced by the first level parts according to at least one reference relationship described in the meta model.

As shown in FIG. 2, in the operation of the export apparatus 14 there follows a step S18, operatively executed by the export file generation unit 24, to write export data for the set of first level parts and the set of second level parts into an export file.

Figure 3:
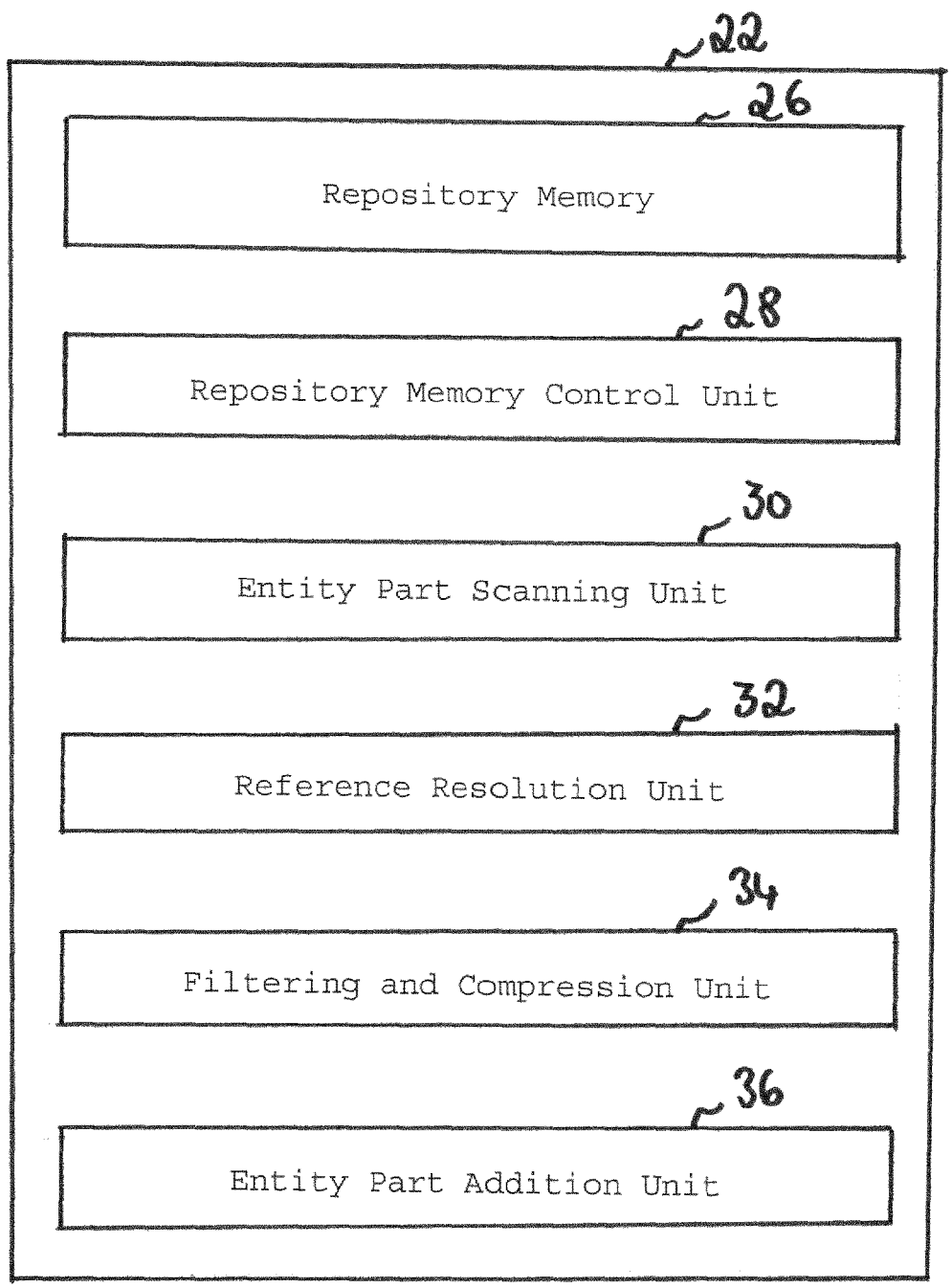
FIG. 3 shows a detailed schematic diagram for the database modeling unit shown in FIG. 1.

FIG. 3 shows a further detailed schematic diagram for the database modeling unit 22 shown in FIG. 1.

As shown in FIG. 3, the data base modeling unit 22 comprises a repository memory 26, a repository memory control unit 28, an entity part scanning unit 30, a reference resolution unit 32, a filtering and compression unit 34, and an entity part addition unit 36.

Figure 4:
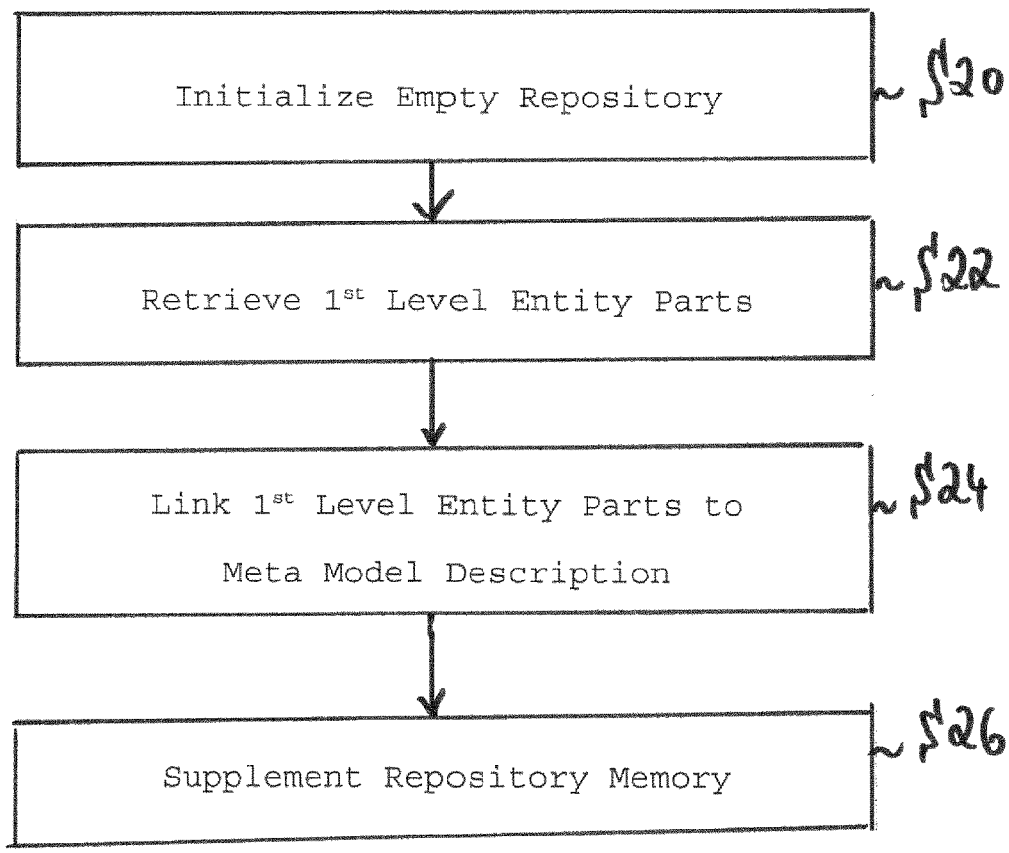
FIG. 4 shows a flow chart of operation for the data base modeling unit shown in FIG. 3.

FIG. 4 shows a flow chart of operation for the data base modeling unit 22 shown in FIG. 3.

As shown in FIG. 4, in the operation of the data base modeling unit 22 there is executed a step S20, operatively executed by the repository memory control unit 28, to initialize an empty repository in the repository memory 26 as a staging memory for the export process.

As shown in FIG. 4, in the operation of the data base modeling unit 22 there follows a step S22, operatively executed by the entity part scanning unit 30 of the data base modeling unit 22, to retrieve identified first level entity parts found by the entity part processing unit 20 in the step S14 in sequence from the source data base 10 and to add every retrieved first level entity part to the repository memory 26.

As shown in FIG. 4, in the operation of the data base modeling unit 22 there follows a step S24, operatively executed by the repository memory control unit 28 of the data base modeling unit 22, to link every added first level entity part to its meta model description.

As shown in FIG. 4, in the operation of the data base modeling unit 22 there follows a step S26, operatively executed by the repository memory control unit 28 of the data base modeling unit 22, to supplement the repository memory 26 with export data.

Figure 5:
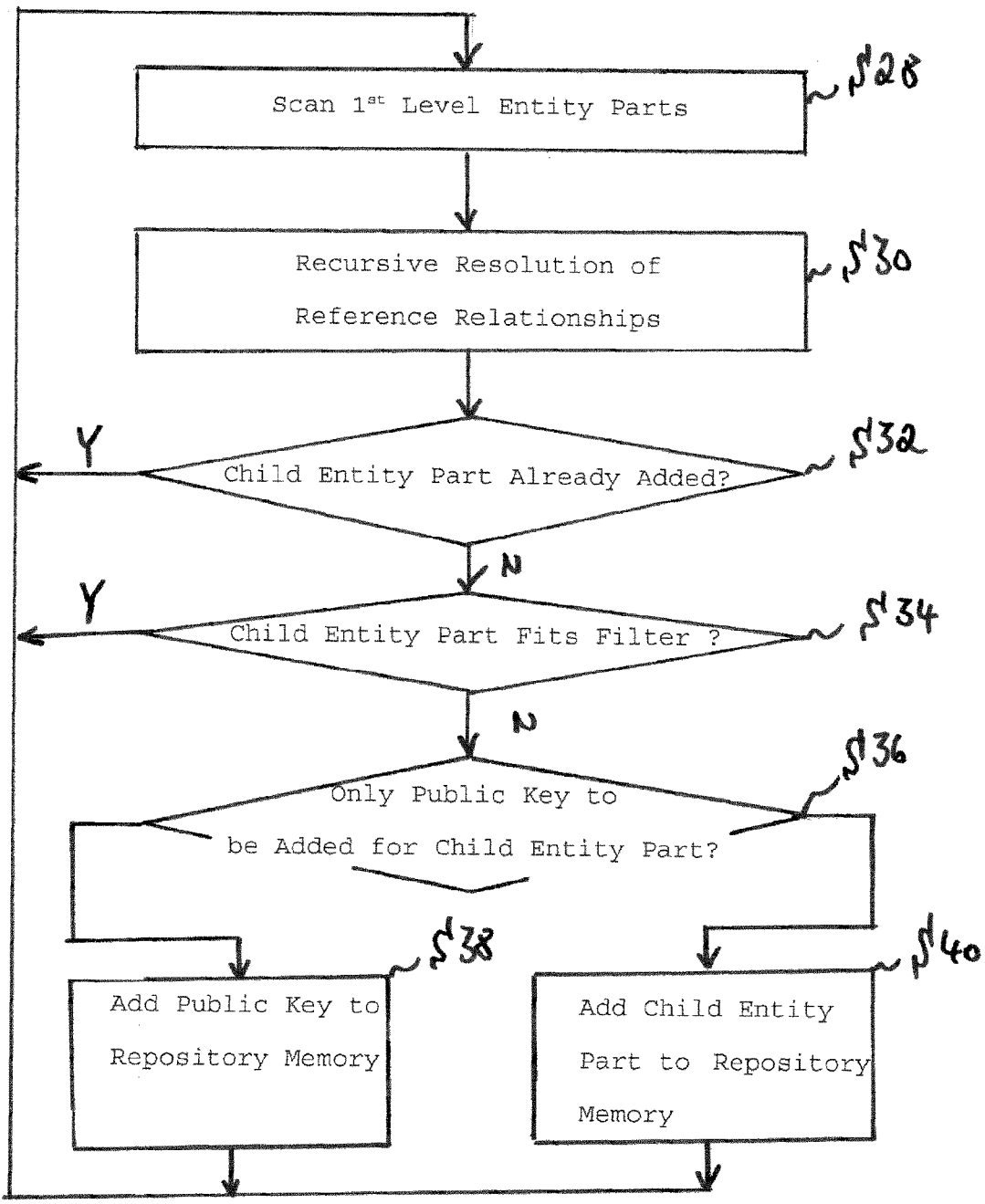
FIG. 5 shows a detailed flowchart of operation for the supplementation of the repository memory with export data.

FIG. 5 shows a further detailed flowchart of operation for the data base modeling unit 22 with respect to the supplementation of repository memory 26 with export data.

As shown in FIG. 5, the supplementation of the repository memory 26 starts with a step S28, operatively executed by the entity part scanning unit 30 of the data base modeling unit 22, to scan the first level entity parts added to the repository memory 26.

As shown in FIG. 5, during the supplementation of the repository memory 26 there follows a step S30, operatively executed by the reference resolution unit 32 of the data base modeling unit 22, to resolve, for every scanned first level entity part, its reference relationships in a recursive manner to identify related child entity parts.

According to the present invention, the step S30 to resolve, for every scanned first level entity part, its reference relationships is executed in a recursive manner to identify related child entity parts such that a 1:1 reference is resolved over one level of hierarchy and such that a 1:n child reference is resolved over at least one level of hierarchy.

As shown in FIG. 5, during the supplementation of the repository memory 26 there follows a step S32, operatively executed by the repository memory control unit 28 of the data base modeling unit 22, to interrogate, for every child entity part, whether it is already added to the repository memory 26 and to add every child entity part to the repository memory 26 when it is not yet added.

As shown in FIG. 5, prior to the addition of a new child entity part to the repository memory 26 there may be executed a step S34, operatively executed by the filtering and compression unit 28 of the data base modeling unit 22, to apply a filter reflecting entity part conditions such that the entity part is added to the repository when its entity part conditions fit the filter.

As shown in FIG. 5, prior to the addition of a new child entity part to the repository memory 26 there may be executed a step S36, operatively executed by the filtering and compression unit 28 of the data base modeling unit 22, to exclude the child entity part from the export file and to include only a public key to the entity part into the export file.

As shown in FIG. 5, depending on the outcome of the interrogation in the step S36, a first alternative is the execution of a step S38, operatively executed by the entity part addition unit 36 of the data base modeling unit 22, to add the public key of the child entity part to the repository memory 26.

As shown in FIG. 5, otherwise, as a second alternative there follows the execution of a step S40, operatively again being executed by the entity part addition unit 36, so as to add data with respect to the child entity part to the repository memory 26. It should be noted that entity part data of a referenced child entity part comprises at least a reference to a parent entity part referencing the child entity part.

Figure 6:
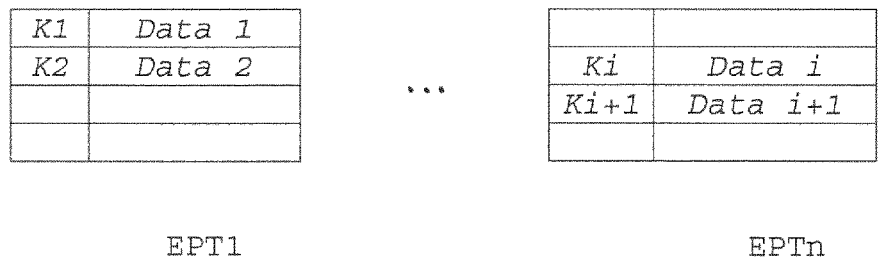
FIG. 6 shows a relational scheme for storing entity data in the repository memory.

FIG. 6 shows a relational scheme for storing entity data in the repository memory 26.

As shown in FIG. 6, relational scheme for storing entity data in the repository memory 26 provides a map for every entity party type EPT1, . . . , EPTn. Also, every map comprises a list of keys or identifiers and related data being identified by the keys or identifiers.

Figure 7:
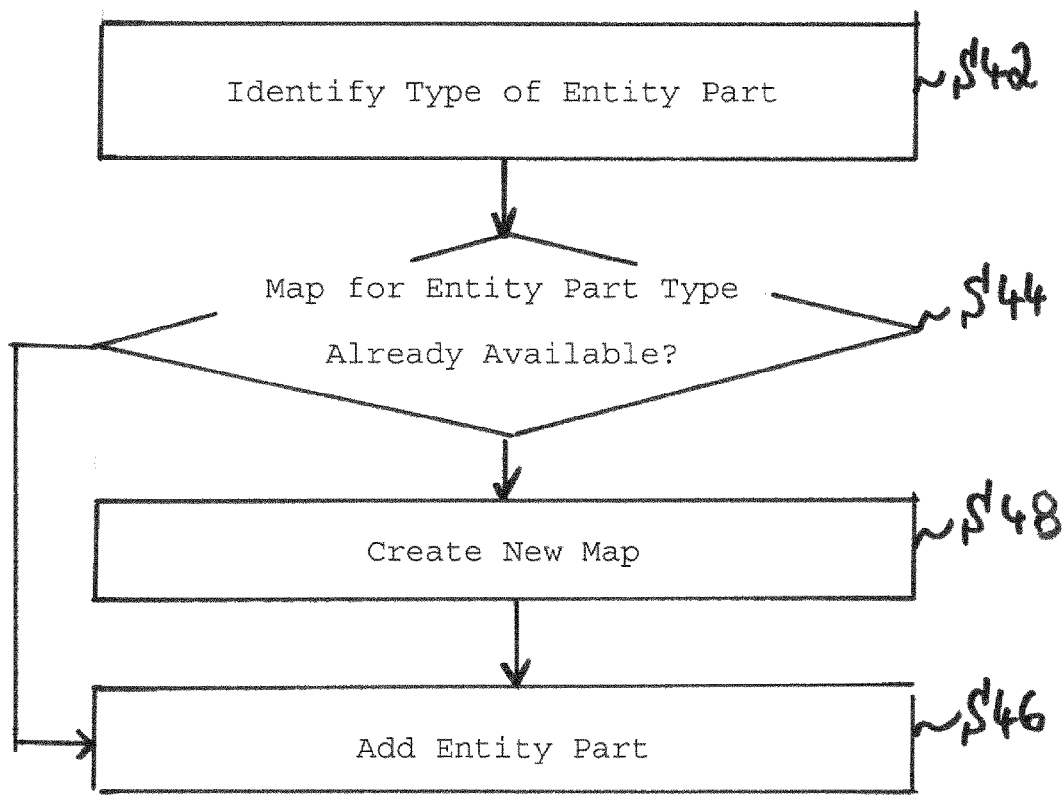
FIG. 7 shows a further detailed flowchart of operation with respect to the addition of export data to the repository memory using the relational scheme shown in FIG. 6.

FIG. 7 shows a further detailed flowchart of operation with respect to the addition of export data to the repository memory 26 using a relational scheme as shown in FIG. 6.

As shown in FIG. 7, in a step S42, operatively executed by the entity part processing unit 20 of the export apparatus 14, there is identified the type of an entity part selected for addition to the memory repository 26, also referred to as candidate entity part in the following.

As shown in FIG. 7, in the evaluation of the entity type there follows a step S44, operatively executed by the repository memory control unit 28 of the data base modeling unit 22, to evaluate whether a suitable map corresponding to the type of the candidate entity part is already available in the repository memory 26. If so, in a step S46, operatively executed by the entity part addition unit 36 of the data base control unit 22, keys and related data of the candidate entity part are added to this map. Otherwise, prior to the addition of the candidate entity map, there is executed a step S48 by the repository memory control unit 28 so as to create a new map in the repository memory 26 in preparation of the addition of the candidate entity part to the repository memory 26 and in accordance with the candidate entity part type.

While above different aspect of the present invention with respect to the execution of the export process from the source data base 10 have been described in the following further aspects of the present invention covering the import of data into the target data base 12 will be described.

Figure 8:
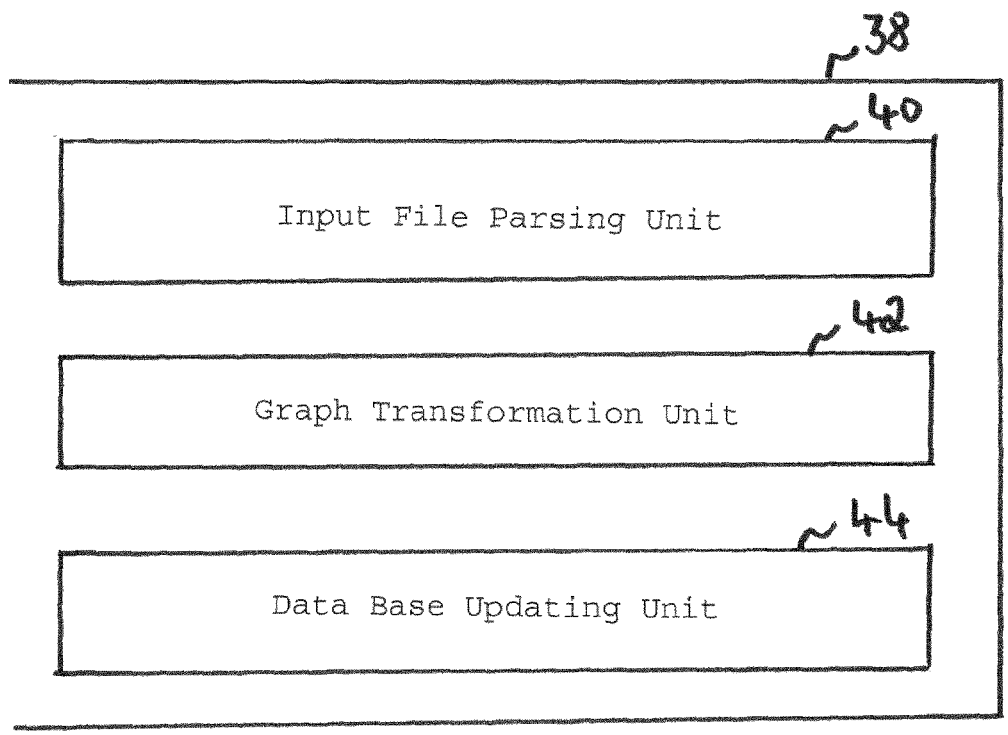
FIG. 8 shows a schematic diagram of an apparatus for executing an import process according to an automated meta model driven import of entity parts from an import file to a target data base.

FIG. 8 shows a schematic diagram of an apparatus 38 for executing an import process according to an automated meta model driven import of entity parts from an import file to a target data base. In the following the apparatus 38 will also be referred to as import apparatus 38.

As shown in FIG. 38, the import apparatus 38 for executing the import process according to the automated meta model driven export of entity parts from the source data base 10 comprises an import file parsing unit 40, a graph transformation unit 42, and a data base updating unit 44.

Further to the explanations provided above with respect to the meta model it should be noted that for the import process the meta model also provides a private child reference.

Generally, the purpose of the private child reference is to identify child entities in the target data base 12 which have to be deleted prior to data import into the target data base 12.

In more detail, a private child reference reflects relationships that are resolvable from a parent entity part of the source data base 10 or the target data base 12, wherein the parent entity part is identifiable outside the source data base 10 or the target data base 12 by a public key. Further, the resolution is to at least one referenced entity part of the source data base 10 or the target data base 12 and is identifiable internally in the source data base 10 or the target data base 12.

As outlined above, the private child reference is used to override a pre-existing aggregation of entity parts in the target data base 12 being referenced from an entity part of the target data base 12 having a key corresponding to the public key the parent entity part in the source data base. E.g., the key correspondence may be described as an identity or as a functional relationship between keys.

Figure 9:
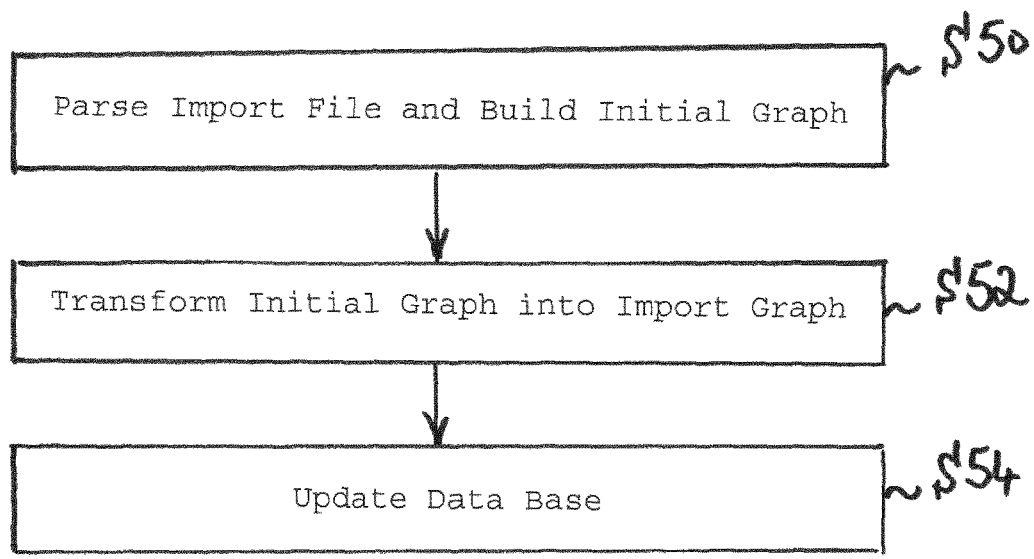
FIG. 9 shows a flow chart of operation for the import apparatus shown in FIG. 8.

FIG. 9 shows a flow chart of operation for the apparatus for executing an import process as shown in FIG. 8.

As shown in FIG. 9, the operation of the import apparatus 38 starts with a step S10, operatively executed by the import file parsing unit 20, to parse an import file to build an initial graph of entity parts according to the meta model in a repository as staging memory for data import into the target data base 12.

As shown in FIG. 9, the operation of the import apparatus 38 continues with a step S52, operatively executed by the graph transformation unit 20, to transform the initial graph in the repository into an import graph of entity parts in line with the meta model of the source data base 10 or the target data base 12.

As shown in FIG. 9, the operation of the import apparatus 38 terminates with a step S54, operatively executed by the data base updating unit 44, to update the target data base 12 on the basis of the import graph of entity parts.

Figure 10:
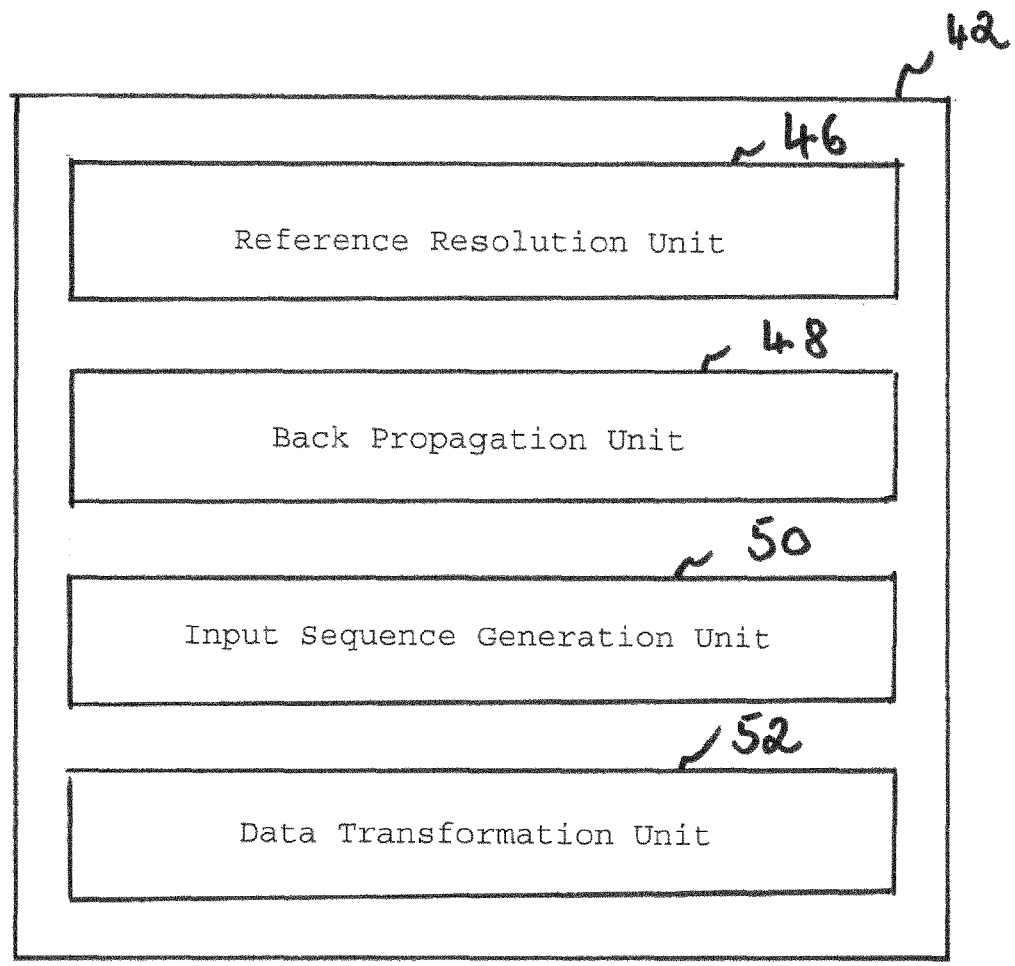
FIG. 10 shows a detailed schematic diagram of the graph transforming unit shown in FIG. 9.

FIG. 10 shows a further detailed schematic diagram of the graph transforming unit 42 shown as in FIG. 9.

As shown in FIG. 10, the graph transformation unit 42 of the import apparatus 38 comprises a reference resolution unit 46, a back propagation unit 48, an input sequence generation unit 50 and a data transformation unit 52.

Figure 11:
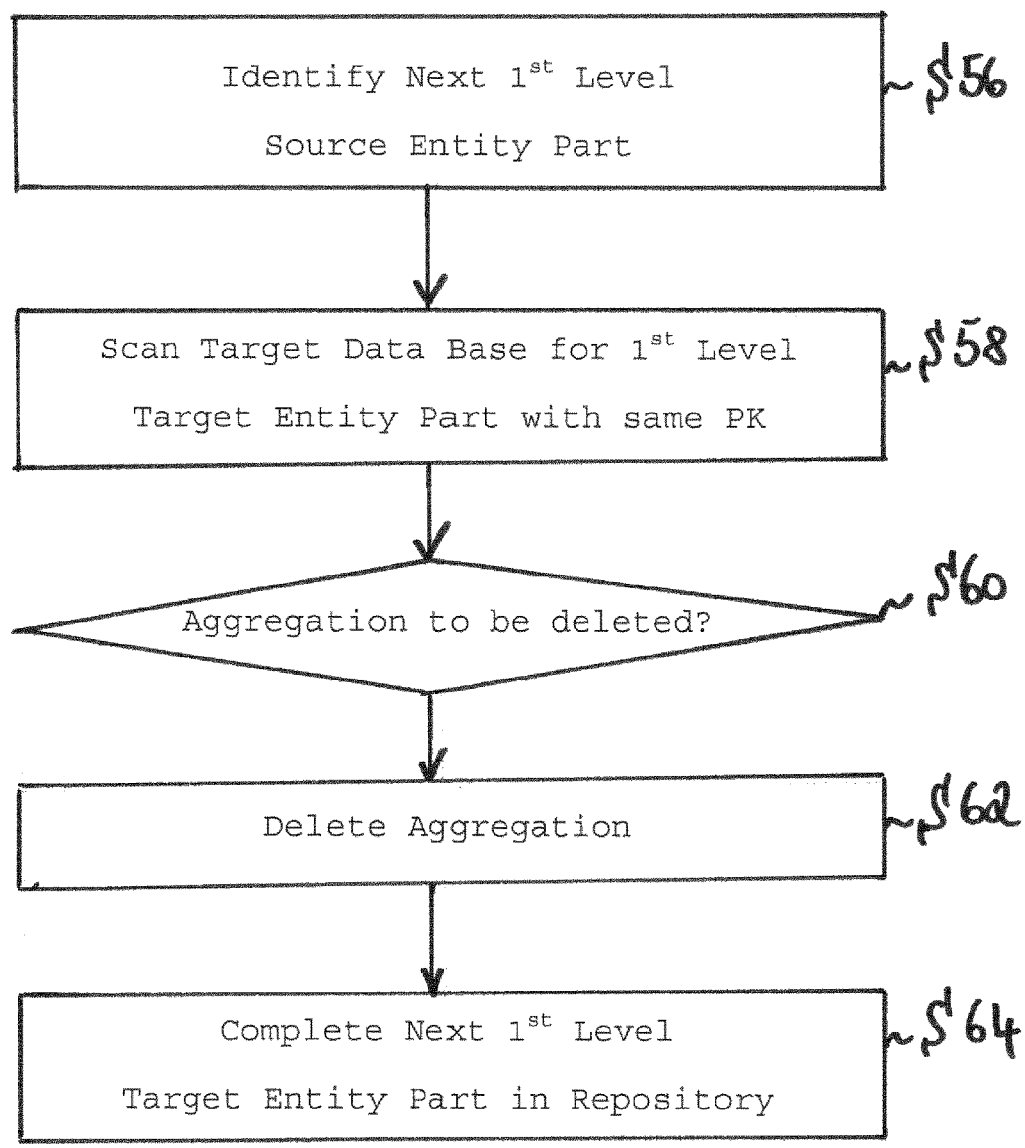
FIG. 11 shows a detailed flow chart of operation for the sub-units of the graph transforming unit shown in FIG. 10.

FIG. 11 shows a further detailed flow chart of operation for the sub-units of the graph transformation unit 42 as shown in FIG. 10.

As shown in FIG. 11, the transformation of the initial graph in the repository into an import graph of entity parts is achieved by repeating a plurality of steps executed by the reference resolution unit 46 of the graph transformation unit 42.

In more detail and as shown in FIG. 11, the graph transformation begins with a step S56, operatively being executed by the reference resolution unit 46, to identify a next entity part in the initial graph being identifiable outside the source data base by a public key as next first level source entity part.

As shown in FIG. 11, the graph transformation continues with a step S58, operatively being executed by the reference resolution unit 46, to search the target data base 12 for an entity part which has a public key corresponding to the public key of the next first level source entity part as next first level target entity part.

As shown in FIG. 11, the graph transformation continues with a step S60, operatively being executed by the reference resolution unit 46, to evaluate whether children of the next first level target entity part are to be deleted according to a private child reference of the meta model. If so, there follows a step S62, operatively being executed by the reference resolution unit 46, to delete these entity parts being referenced by the next first level target entity part. Otherwise the step S62 is skipped.

As shown in FIG. 11, the graph transformation terminates with a step S64, operatively being executed by the sub-units of the graph transformation unit 42, to complete the next first level target entity part and its referenced entity parts with data from the target data base 12.

In the following details of the completion of the next first level target entity part and its referenced entity parts with data from the target data base will be described. Once such completion is achieved for all entity parts to be imported into the target data base 12, related data as stored in the repository is written into the target data base 12.

It should be note that for the purpose of executing the import process references in the source data base 10 and the target data base 12 are differentiated as public references or transient references being changeable upon import into the target data base.

Figure 12:
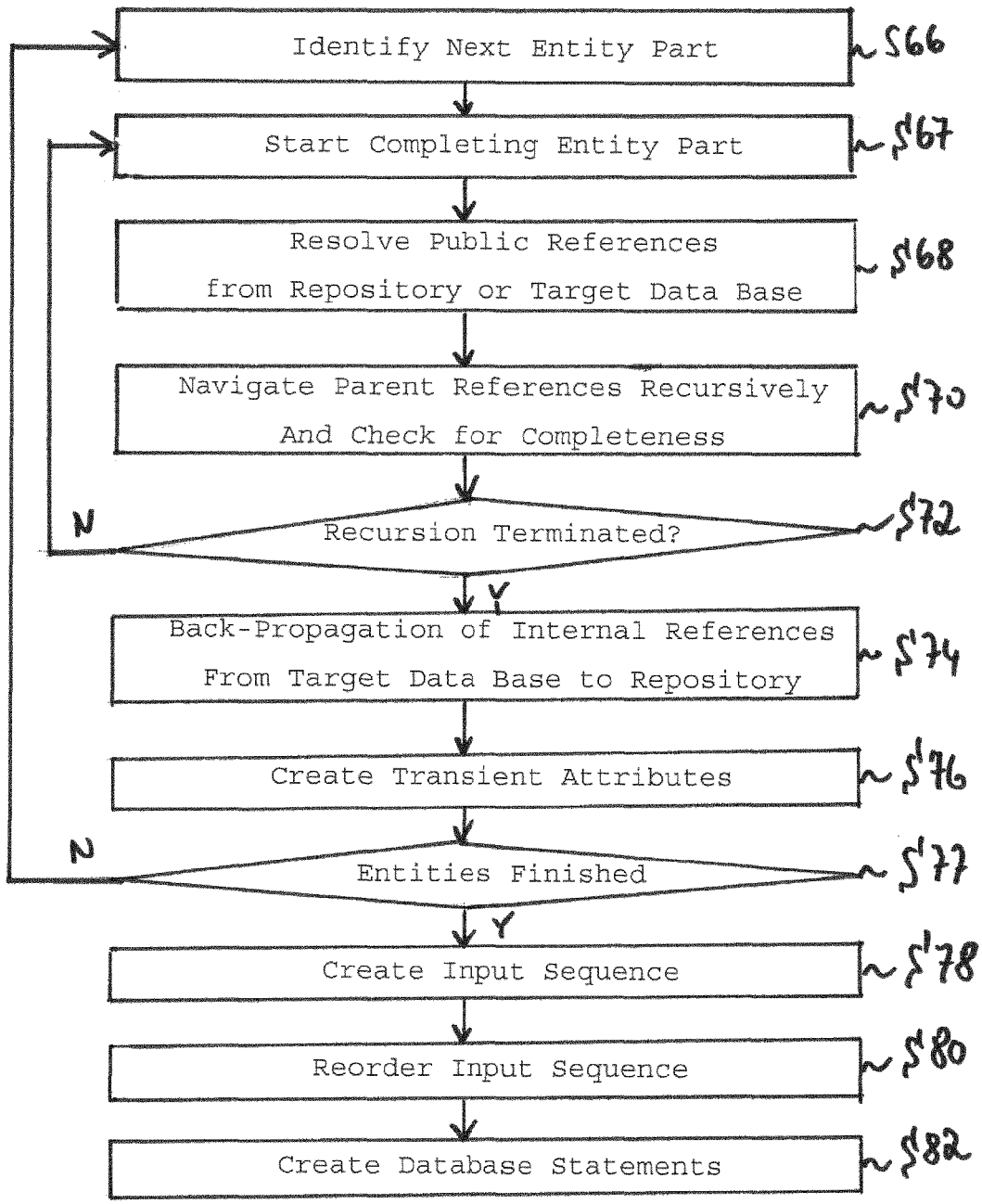
FIG. 12 shows details of preparing a candidate entity part for update and insertion into the target data base.

FIG. 12 shows details of preparing a candidate entity part for update and insertion into the target data base 12.

As shown in FIG. 12 the completion process begins with a step S66, operatively being executed by the reference resolution unit 46 of the graph transformation unit 42, to identify a next first level target entity part of the target data base 12 which is a candidate entity part for update or insertion into the target data base 12. Then follows a step S68, operatively being executed by the reference resolution unit 46 of the graph transformation unit 42, to start the completion of the considered entity part.

As shown in FIG. 12 the completion process continues with a step S68, operatively being executed by the reference resolution unit 46 of the graph transformation unit 42, to resolve public references of the candidate entity part either from the repository, if possible, or otherwise from the target data base 12.

As shown in FIG. 12 the completion process continues with a step S70, operatively being executed by the reference resolution unit 46 of the graph transformation unit 42, to navigate parent references recursively and to check for completeness.

As shown in FIG. 12 the completion process continues with a step S72, operatively being executed by the reference resolution unit 46 of the graph transformation unit 42, to evaluate whether the recursion terminated. If so, the recursion ends and otherwise it will be continued. This allows to walk the parent relations up the tree and to complete the parent entity first.

As shown in FIG. 12 the completion process continues with a step S74, operatively being executed by the back propagation unit 48 of the graph transformation unit 42, to propagate references being identifiable internally in the target data base 12 and corresponding to transient references parsed from the import file from the target data base 12 into the import graph. The step S74 is executed when the considered entity part is in the target data base.

As shown in FIG. 12, when the considered entity part is not in the target data base, the completion process continues with a step S76 operatively being executed by the data transformation unit 52 of the graph transformation unit 42. It is assumed that each entity part in the initial graph is characterized by entity type, at least one attribute, and a list of references to children. The step S76 is executed to create transient attributes for entity parts being newly inserted to the target data base and to fill the transient attributes according to rules specified in the meta model. Once the transient attributes are created there follows an interrogation in step S77 whether all relevant entity parts are processed. If not, the recursion branches back to step S67, otherwise the recursion is finished.

As shown in FIG. 12 the completion process continues with a step S78, operatively being executed by the input sequence generation unit 50 of the graph transformation unit 42, to create an import sequence or input sequence for entity parts in the import graph in accordance with types of references according to a rule that child entity parts follow parent entity parts.

Further, the input sequence generation unit 50 also executes a step S80 to reorder the import sequence such that entity parts which are referenced are listed prior to entity parts referencing entity parts.

As shown in FIG. 12 the completion process terminates with a step S82, operatively being executed by the data transformation unit 52 of the graph transformation unit 42, to update the target data base 12 on the basis of the import graph by creating database statements modeling the import graph for subsequent storage of the created database statements in the target data base 12. Optionally the step S82 serves to create internal keys for entity parts to be newly imported into the target data base 12 or to create attribute values for entity parts.

In the following more specific embodiments of the present invention will be explained with respect to FIGS. 13 to 17.

Figure 13:
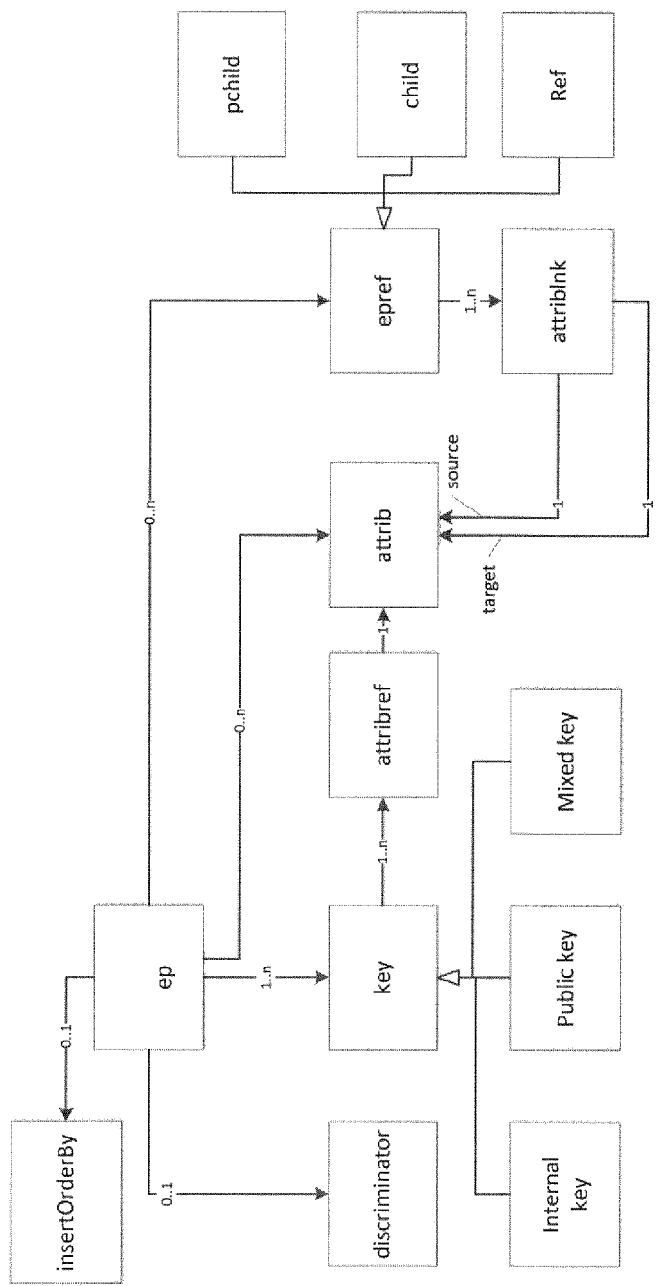
FIG. 13 shows an instantiation of a meta model using an object-orient paradigm.
Figure 14:
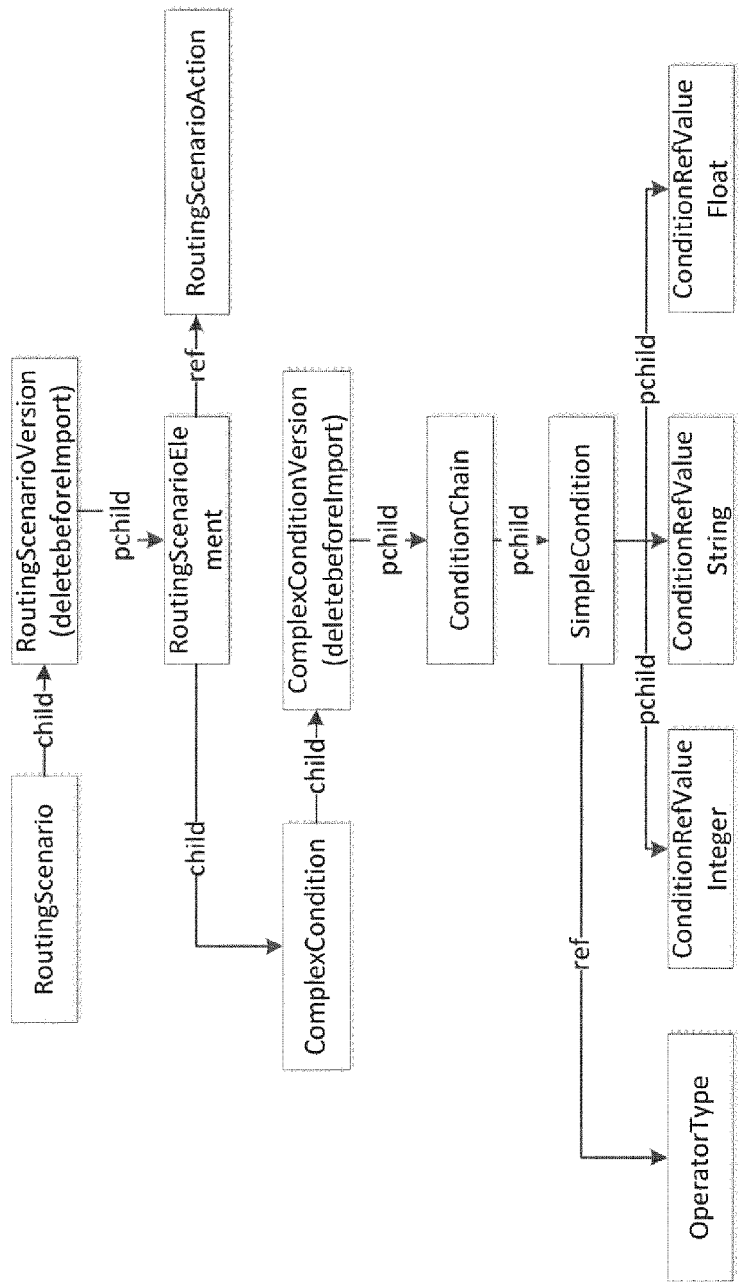
FIG. 14 shows an example of the meta model using the object-orient paradigm as shown in FIG. 13.

Heretofore, there will be described a meta model using an object-orient paradigm as shown in FIGS. 13 and 14. Then follows a description of an export and import process according to the present invention with reference to FIGS. 15 to 17.

As explained above, according to the present invention the concept of an aggregation is introduced into the meta model and the meta model driven method for import and export:

1) According to the present invention, e.g., a XML schema for the meta model is enhanced to allow the definition of an aggregation relation (private collection) between entity parts eps.
2) Entity parts eps being part of a private collection are denoted as $2^{nd}$ level eps.
3) Collections of $2^{nd}$ level eps are denoted by qualifying the relationship to these eps in the meta model with "pchild" referring to "private child".
4) The $1^{st}$ level ep reached when following the "parent" relationship in the meta model is denoted as "owner" ep of the private collection.
5) If the owning $1^{st}$ level ep already exists in the target data base, the collection of $2^{nd}$ level eps has to be completely exchanged by the content of the data set to be imported.

If now according to the new concept underlying the present invention an aggregation is configured in the meta model, it is assumed, that a data set for import contains all "valid" children and all children existing in the target data base 12 that have to be exchanged.

According to the present invention there will therefore be executed a first search for the parent entity part in the target data base 12, followed by a deletion of all children, which are available in the target data base 12, but not in the import file. Then it will execute an update operation on each child entity part loaded from the import file, which could be found in the target data base 12 already and an insert operation on each child entity part which could not be identified in the data base 12. During this operation, new internal identifiers for the objects to be imported will be created.

In order to be even more flexible when defining the graph of entity parts in the meta model, a new construct is introduced which allows to qualify entity part (parts) by conditions on attribute values. Thus it is possible to specify a dedicated subset of entity parts eps stored in a data base table not only by evaluating relationships to other entity parts, but also by dedicated attribute values.

A further enhancement to the meta model allows to qualify a $1^{st}$ level entity part ep with a new flag called "deleteBeforeImport". If this option is specified, the $1^{st}$ level entity part ep and its private collections contained in an import file will be deleted from the target data base 12 and freshly inserted from the import file contents.

FIG. 13 shows an instantiation of a meta model using an object-orient paradigm.

As shown in FIG. 13, a meta model describes the entity parts stored in a data base together with their relations among each other in an abstract manner. It specifies the various attributes of entity parts, the public and internal identifiers and references to other entity parts.

A meta model is process related and therefore built separately for each application case. It may reflect the whole graph of entity parts stored in a data base, but more often it will reflect only the subset of the entity part graph related to a specific application case.

The meta model schema represents the common language behind the various meta model files. The supported schema elements are listed in the table below.

| Schema Element | Description |
| --- | --- |
| ep | ep is a entity part part, corresponding to a data base table; important properties of a ep are: name: a bep is uniquely identified by its name dbtable: data base table corresponding to the bep, used to build sql statements exportMode: specifies, whether a bep is exported at all, or just the public key is named exportMode: full (normal) or refrence; in the latter case the entity part is not exported to the data file, it is assumed to be public configuration data witch is already available in the target |

-continued

| Schema Element | Description |
|---|---|
| | data base and does not need to be transported
deletebeforeimport: privately owned children are deleted in target data base before being imported again
A ep has a list of attributes and one mandatory internal key. A ep may have a public key, several (unique) to-1-references and several to-n-refernces, so called child references.
On export the unique references are resolved and all records specified by child references are exported as well. Eps referenced by child relationships (see below) have to have a back reference to their parent in case they have attribute values which have to be inherited from their parent on import. |
| attrib | attrib represents the attribute of a ep. Important properties of an attribute are:
tagname: name of the attribute
dbcolumn: name of the data base column used to generate sql statements
valueOnImport (null | default | file): import modus, defaults to "file"
attribtype (transient | persistent): is the value of this attribute imported as is from file to a target data base, or is it created on import (by sequence, select max(), inherited from parent)
defaultvalue: default value on import, only effective is valueOnImport = default
createIfTransient (Y|N): only effective for transient attributes; just one attribute of a bep may have this specification |
| key | key of a ep; a key is a (named) collection of attribute references; important properties of a key are:
name: unique name of the key
keytype: internal, public or mixed key, defaults to internal;
Keys are classified as internal, public or mixed. Each ep has to have an internal key, which is most often a number or a string calculated locally in the data base. A public key is a unique identifer of an entity part, which is created once when the object is created and never changed. It is used to identify the entity part in a broader context, e.g. across data bases. It is not necessarily a UUID.
A mixed key is a combination of persistent attributes and transient attributes, where the transient value is inherited from a referenced ep, which in turn has a public key. |
| attribref | attribref just represents the name of an attribute and is used to list all attributes building a key of a ep |
| epref | Reference to entity part part; consists of reference name and name of ep. A reference can be of 3 different types:
ref: this is a 1:1 reference to another entity part (e.g. description for a domain value)
child: this is a 1:n relationship, which will be cascaded on export and followed on import for the propagation of internal keys
pchild: this is a 1:n relationship, which will be cascaded on export; on import the specified subset of entites |
| | will be deleted in the target data base prior to import; also the internal keys of the parent objects will be propagated |
| attriblnk | attriblnk is used to model a reference between eps; it names the attributes from source and target ep referring to each other |
| discriminator | Discriminator is used to specify attribute conditions in order to further qualifiy Beps; thus only a subset of entries in a data base table is considered as specific ep; |
| insertOrderBy | insertOrderBy is used to determine the right sequence in case of attribute generation on insert (ascending, descending). |

The UML diagram shown in FIG. 13 gives a graphical overview of the schema elements and their relations among each other. It shows the different kinds of keys (Internal Key, Public Key, Mixed Key) as specializations of the entity part key and the different kinds of references (ref, child, child) as specializations of the entity part epref.

Thus the meta model file contains directions for an ETL tool realizing the export process according to the present invention. It specifies which subset of the graph described in the meta model has to be extracted from the source data base 10 when starting an export process from a set of "$1^{st}$ level" entity parts eps identified by public (or mixed) keys. It will extract the specified entity parts and all referenced entity parts up to the following level:

1) Relations of type "ref" will be followed once (1 step expansion).
2) Relations of type "child" or "pchild" will be followed cascadingly until no further relation of type "child" or "pchild" exists.

The meta model file also contains directions for an import process as it specifies:

3) how to populate attribute values on the target entity parts (e.g. from content of the import file, from default values, ascending or descending counters etc.)
4) consistency checks (datatype, mandatory)
5) how to create internal keys if needed
6) how to propagate internal keys from parent to child entity parts
7) how to treat relationships The following explanations relate to the schema elements ep, attrib and key.

The attrib structure shown in FIG. 13 relates to the attribute of an entity part ep. It defines an attribute name and data type, the potential mapping to a data base column and gives instructions on handling for export and import.

One of the most important qualifiers is the attribtype, which can be transient or persistent. In case of "persistent", the value of this attribute is imported "as is" into the target data base 12. In case of "transient" the value of this attribute can be created on import, either by any kind of sequence logic or by inheriting the value from the parent. The value of a transient attribute is created in the scope of the target data base 12.

Some of the attributes of an entity part ep play the role of keys. A key is a (named) collection of attribute references. An attribute reference is just the attribute name as described in schema excerpt below:

There are public keys which do not change their value for an object instance even if the object is maintained in different data bases. Thus they can be used as reliable identification criteria. Internal keys are identifiers which are unique only in the scope of a single data base. If an object is transported from one data base to another, the internal keys have to be recalculated.

Each entity part ep has to have an internal key. A key has a unique name and a type, which can be internal, public or mixed. A mixed key is a combination of persistent attributes and transient attributes, where the transient value is inherited from a referenced entity part ep, which in turn has a public key.

The following explanations relate to the schema element entity ep shown in FIG. 13.

According to the present invention new optional entity part ep property called "deleteBeforeImport" is introduced. This property will be configured in the meta model and direct any tool implementing the meta-model driven synchronization logic to apply a different behavior when importing a corresponding entity part contained in a data import file.

When such a tool executes an import task, it will try to identify entity part ep instances in the target data base 12 which are contained in the model file and flagged with "deleteBeforeImport". Then it will physically delete these entity part ep instances and their aggregation from the target data base 12 before executing the insert of the new bep aggregation contained in the import file.

As explained above, the new property can be specified in the model file only for entity parts eps having public keys defined.

The following explanations relate to the elements ep and discriminator shown in FIG. 13.

According to the present invention a new element called discriminator is added to the entity part ep structure. This element allows specifying conditions on the attribute values of an entity part ep already in the meta model. This kind of qualification can be used to distinguish entity part parts in case these entity parts have a different meaning but are stored in the same data base table. An example for such a construct are entity parts having a state attribute with values "active" or "in work" or "tobedeleted" and objects with value "tobedeleted" shall be ignored for the purpose of export and import.

The following explanations relate to the element epref shown in FIG. 13.

According to the present invention a new relation type for aggregations is introduced. This relation type is called "pchild" referring to a private child relationship.

For exporting, a pchild relation will be handled like a child relation between entity parts eps. Any tool (e.g. ESH) has to navigate the meta model file, expand all child respectively pchild relations and collect the related objects for export. The tool has to stop expanding relations between entity parts eps if there are no further relations of type child or pchild configured. Relations of type "ref" will be expanded only to the referenced entity part.

The element epref describes a relationship to another entity part part from the view of the "owning" entity part ep. Each relationship has a unique name in the scope of an entity part. In case it is a plain reference it is qualified by "ref" as reftype value. In case the relationship is a 1:n relationship, which shall be followed on export, it is qualified by reftype value either being "child" or "pchild".

A reference between entity parts eps is described by listing a sequence of attribute which implement the link. The attriblnk element names the attributes from source and target entity part ep referring to each other.

FIG. 14 shows an example for the meta model configuration of references, child relationships and aggregations which will be explained in the following.

The scenario shown in FIG. 14 illustrates entity parts used for a message routing configuration in a messaging subsystem. A message is a set of key value pairs. The message routing scenario is a versioned object. Each version of the routing scenario is a collection of items. Each of the items represents a set of conditions to be evaluated on the message content. The items are worked sequentially and the conditions are evaluated on the message content. As soon as all conditions match, the routing action is executed for the message which means that the appropriate queue is selected or the message is discarded for example.

The table below lists the objects depicted in the diagram shown in FIG. 14.

| Entity part | Description | Relations |
|---|---|---|
| Routing Scenario | Root object of all message routing scenarios | Has lots of versions; 1:n relationship; only one version is valid at certain point in time |
| Routing Scenario Version | Different versions of the routing scenario | Aggregates routing scenario elements in a private child relationship; elements are worked sequentially |
| Routing Scenario Element | A single item of a routing scenario version. | The element refers to a routing action and to a complex condition. There is direct relation between element and complex condition, but in order to follow the relation on export, the relation has to be denoted as child. |
| Routing Scenario Action | Action to be executed, e.g. write to target queue xyz | — |
| Complex Condition | Root object of a condition | Has lots of versions; 1:n relationship; only one version is valid at certain point in time |
| Complex Condition Version | Different versions of the complex condition | Aggregates condition chains; multiple conditions chains implement an "or" conjunction |
| Condition Chain | Represents one part of an "or"- condition | Aggregates simple conditions which implement and "and" conjunction |
| Simple Condition | Condition on a single attribute of a message | The condition compares a single message attribute to a reference value (of potentially different data type). It refers to an operatortype and aggregates the reference values. |
| Operator Type | Operator for comparison | — |
| Condition RefValueInteger | Reference value of type integer | — |

-continued

| Entity part | Description | Relations |
|---|---|---|
| Condition RefValueString | Reference value of type string | — |
| Condition RefValueFloat | Reference value of type float | — |

The meta model file describes exactly these relationships between the objects. Most important facts to be highlighted are:
1) There is a child relationship between RoutingScenario and RoutingScenarioVersion. This means that all available versions will get extracted together with a Routing scenario.
2) In case exactly one version is specified for extraction, only the "parent" entity part will get extracted but not any other associated versions.
3) All RoutingScenarioElements will get extracted with their "parent" RoutingScenarioVersion.
4) If a RoutingScenarioVersion exists already in a target data base 12 it will get deleted together with all linked RoutingScenarioElements before a new import is executed. No other entity part parts will get deleted, neither the ScenarioAction nor the ComplexCondition.
5) ComplexConditions are independent entity parts with an own versioning logic. They are linked to RoutingScenarioElements, but not "privately" owned. They can be used by various elements. Therefore they must not be deleted on import of a RoutingScenarioElement.
6) A ComplexCondition will get extracted if a RoutingScenarioElement is extracted, which is linked to the ComplexCondition.
7) In order to establish "or" and "and" conjunctions, the entity part parts "ConditionChain" and SimpleCondition are used. These entity parts are aggregated by a ComplexConditionVersion. They are "privately" owned and have to be deleted before import.
8) Also ConditionRefValues are aggregated entity parts and have to be deleted before import as indicated by the pchild relationship.

Figure 15:
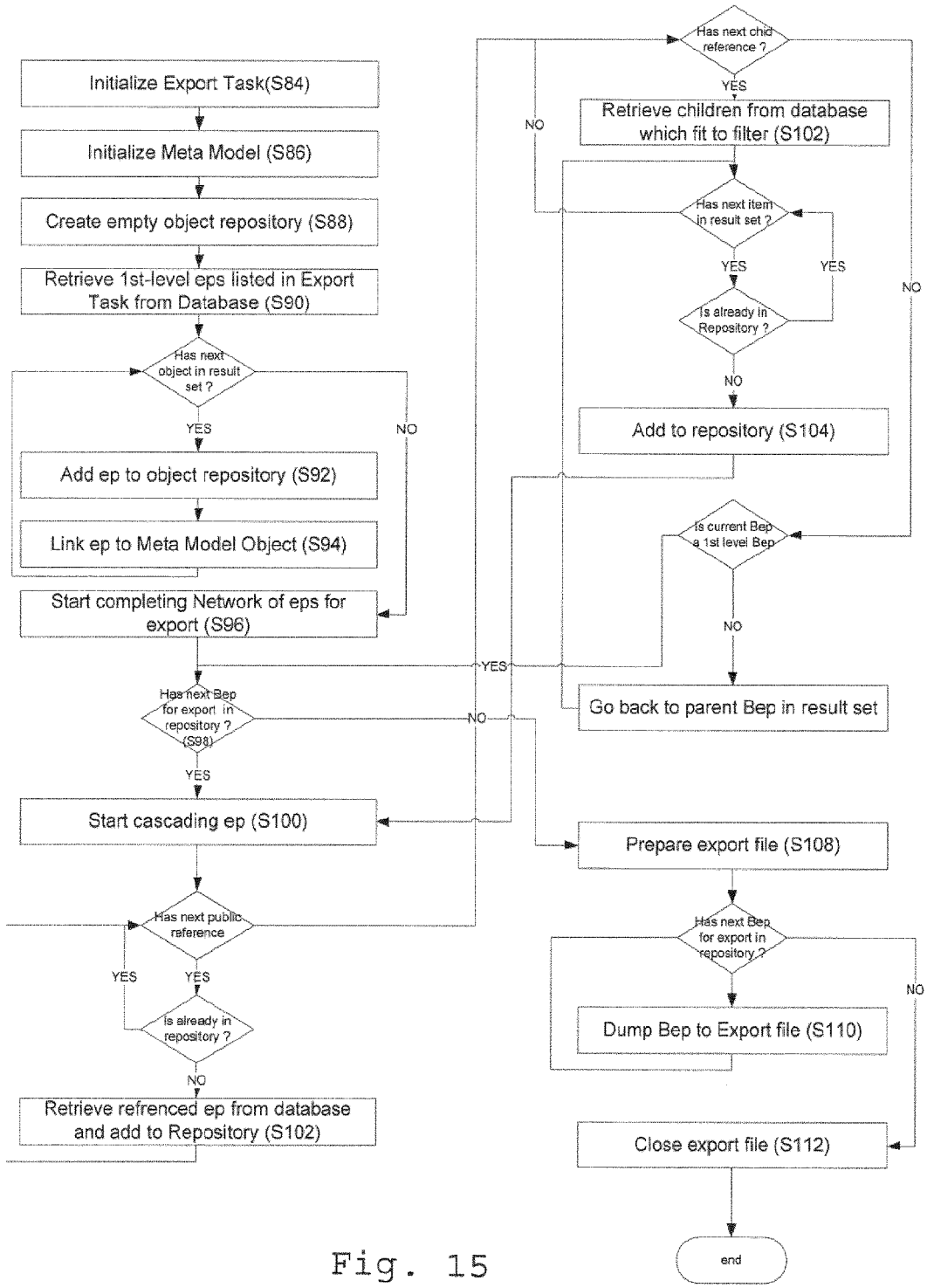
FIG. 15 shows a detailed flow chart of operation for the export process according to the present invention.

FIG. 15 shows a detailed flow chart of operation for the export process according to the present invention.

As outlined above, the meta model driven export is based on the idea of specifying one or more $1^{st}$ level entity parts eps in a task file. Then the set of entity parts to be exported will be enriched by all dependent objects, which are references and children, described in the meta model.

Relationships classified as reference will be followed one step deep in order to retrieve the referenced object. Relationships classified as child relationships (either private or public) will be followed in a cascading manner.

The objects are collected in an object repository and finally exported, e.g., to an XML file.

The meta model allows to exclude certain entity parts from the export file and include only references via public keys to these object. This reduction of the export file content makes sense in case reference/set-up data, which will never change and therefore does not need to be transported between data bases.

In the following, the export process according to the present invention as shown in FIG. 15 will be described in detail.

As shown in FIG. 15, first of all the export task will be initialized either from an external task file or from an entry in the data base (S84). The task file has XML format and lists the $1^{st}$ level entity parts eps to be exported by specifying the entity part type and the primary keys of the entity part, which can be public or private keys. The task file also mentions the meta model which shall apply to the export process. The meta model describing the entity parts (eps) and the entity part (ep) network is constructed from the meta model file (S86). An empty object repository is initialized which will be used as staging area for the entity parts to be exported. The object repository is a set of key/object maps with a map for each ep type (S88).

As shown in FIG. 15, then the $1^{st}$ level eps (export candidates) mentioned in export task are retrieved from the data base (S90). The entity parts eps are added to the repository (S92) and connected to the meta model entity parts (S94).

As shown in FIG. 15, then the process of completing the ep network by retrieving referenced entity parts eps and child entity parts eps is started (S96). The list of export candidates already inserted into the object repository is processed (S98). For each entity part ep a completion algorithm is started (S100).

As shown in FIG. 15, first of all the reference relationships are followed one level deep and the referenced entity parts eps are retrieved from the source data base 10 and added to the object repository (S102). Then all child relationships are processed. Children are not only identified by the relationship to their parent but also by potentially existing further attribute conditions described by an optional discriminator in the model file. For each relationship the children fitting to a potentially configured filter are retrieved from the source data base 10 (S104). Each child ep retrieved from the data base will be added to the repository (S106) and then cascaded with the same logic as the parent ep. Cascading the relationships ends if no further child relations are available.

As shown in FIG. 15, finally the content of the object repository is dumped to an export file, e.g., a XML file (S108, S110, S112).

Figure 16:
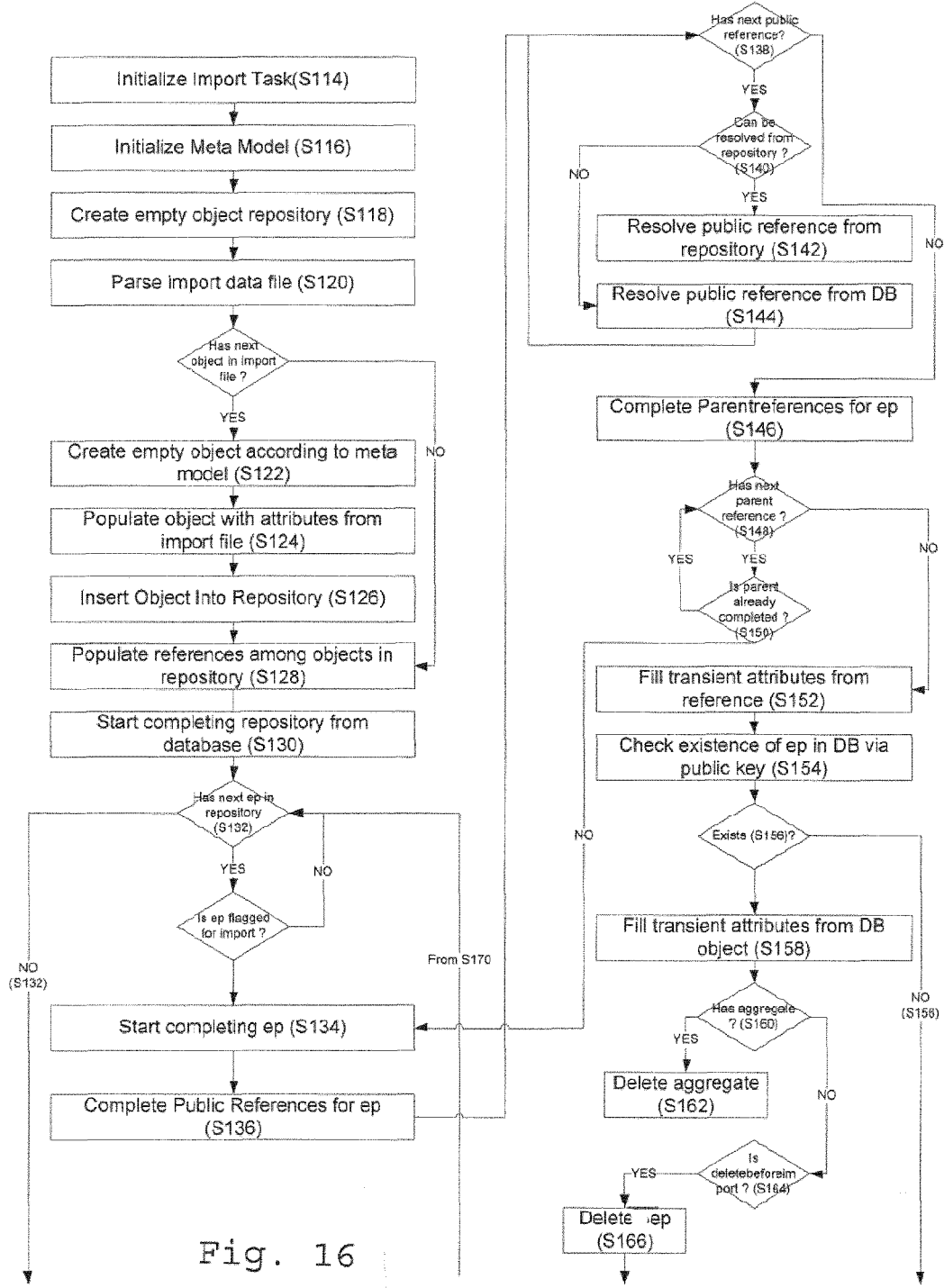
FIG. 16 shows a detailed flow chart of operation for the import process according to the present invention.

FIG. 16 shows a detailed flow chart of operation for the import process according to the present invention.

The meta model driven import is driven by the contents of an import file carrying the attributes of entity parts eps and the relationship between these entity parts eps described in a meta model file.

An import can be started in "insert only" mode or in a mixed insert and update mode.

Basic approach is to read the contents of the import file and build an object network according to the relations described in the meta model file. The object network will then be completed by references to objects already contained in the target data base. Also an identification process is started based on public key identification which checks for potential existence of the eps to be imported in the target data base. Internal keys will be created if necessary or propagated from the entity parts in the target data base. After the object repository has been completed, the insert sequence of entity parts is determined by evaluating references and child relationships. Then the requested insert and update is executed.

Figure 17:
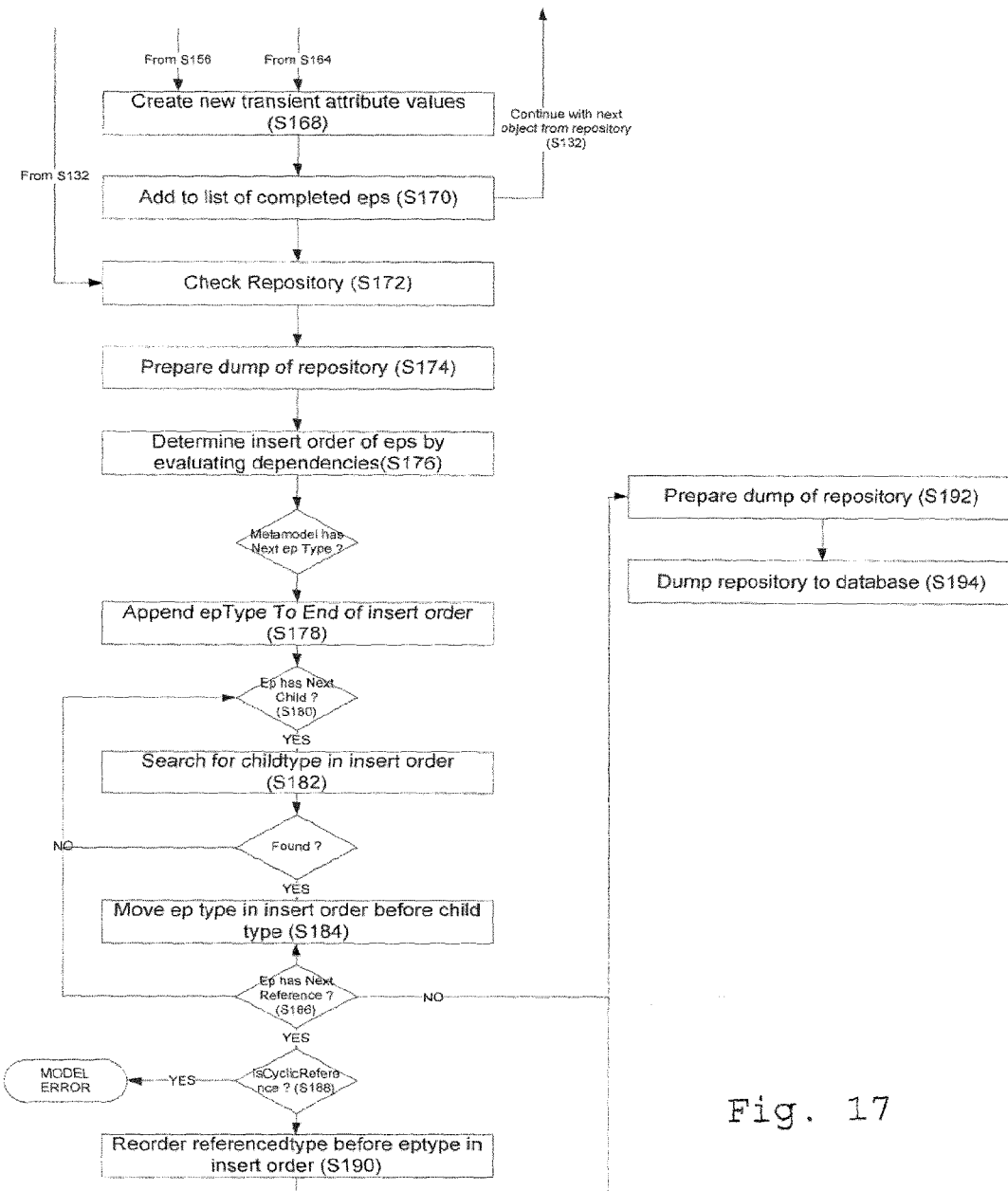
FIG. 17 shows a continuation of the detailed flow chart of operation for the import process according shown in FIG. 16.

The import process shown in FIG. 16 and FIG. 17 is described below.

As shown in FIG. 16, first of all the import task will be initialized (S114). The meta model file to be used for the import will be parsed and the meta model describing the entity parts eps with their keys, attributes and relationships among each other is build (S116). An empty ep repository to be used as staging area is created (S118).

As shown in FIG. 16, then the import file is parsed (S120). An ep object is created according to the meta model specification (S122) for each entity part listed in the import file. Each entity part listed in the import file contains its type together with a list of key/value pairs for the entity part attributes and a list of references respectively children identified by their public and internal keys. The attributes in the import file are used to populate the attributes and keys of the entity part ep as well as the identifiers of references to other entity parts eps (S124). Then the entity part ep is inserted into the object repository (S126).

As sown in FIG. 16, now the object network in the repository among the entity parts eps read from the import file is prepared by evaluating the temporary internal keys and public keys of the referenced objects according to meta model specifications (S128).

As shown in FIG. 16, after this step all entity parts eps in the repository are processed (S130) because they need to be completed with information from the source data base 10 (S134).

As shown in FIG. 16, first of all the references to other entity parts eps identified by public keys are completed, provided the references objects are not already contained in the object repository (S136). In order to accomplish this, the list of references is looped. If possible, the reference is resolved from the repository (S142), if not the target data base 12 has to be accessed. The keys stored in the place holder objects created during import are used to retrieve the referenced objects from the target data base (S144).

As shown in FIG. 16, then the parent/child relationships are established recursively (S150) using the "internal" temporary keys from the import file (S148). The temporary "internal" key is considered a transient attribute which will get a new value in the scope of the target data base. The values of attributes used to resolve references to a parent are inherited from this parent, they have to have the same value. Due to this the "parent" references in the object network have to be followed and the key value from the referenced parent object has to be filled (S152).

As shown in FIG. 16, after processing the parent references, the entity part ep existence in the target data base 12 is checked using the public key (S154). If the object exists already the values of the attributes classified as "transient" in the model file (these are the internal keys) are retrieved from the target data base object and overwrite the corresponding attribute of the entity part ep in the repository (S158).

As shown in FIG. 16, if the object exists and has aggregates (S160), these aggregates are deleted before import (S162). If the entity part ep is flagged to be deleted from the target data base before import, this happens now (S164).

FIG. 17 shows a continuation of the detailed flow chart of operation for the import process according shown in FIG. 16.

As shown in FIG. 17, if the entity part ep does not exist in the target data base 12 yet, the transient ep attributes are created and filled according to the rules specified in the meta model file, e.g. by drawing the next number from a data base sequence (S168). Then the entity part ep is added to the list of completed entity parts (S170).

As shown in FIG. 17, finally after having processed all entity parts eps from the repository, this is checked for consistence (S172) before the dump of the repository content to the data base is initiated (S176).

As shown in FIG. 17, the insert order of the entity parts eps is determined by evaluating the dependencies (reference relationships and parent/child relationships) described in the meta model (S176).

As shown in FIG. 17, all entity part types or ep-types listed in the meta model are investigated. First a ep-type is appended to the end of the insert order (S178). If the entity part ep has children, the child types are searched in the insert order list (S182). In case a child type is found earlier in the insert order, the ep-type is removed from the end and inserted before this child type in the insert order (S184, S186).

As shown in FIG. 17, then referenced types are reordered before the ep types they refer to (S190). In case a cycle reference is detected (S188) an error condition is raised and the import process is stopped. This is considered a defect in the meta model.

As shown in FIG. 17, finally dynamic data base statements, e.g., SQL statements, are generated (S192) which are used to dump the content of the repository to the target data base 12.

As shown in FIG. 17, the last step is then the execution of the insert respectively update statements towards the target data base 12 (S194).

In conclusion, the present invention actually allows a fully automated model driven approach to entity part replication and synchronization.

Applications capable of reading and interpreting a predetermined format, e.g., XML can implement a model driven synchronization between entity part instances stored in different relational data bases.

As long as data import files are created according to the meta model description for a set of related entity parts they can be imported from internal and external data sources with clear specification of data mastership of the exporting system.

In view of the above an understanding of the present invention may be summarized as follows:

As outlined above, the present invention relates to meta-model driven import and export of data and more particularly to a method and apparatus therefore.

The term business entity describes something which is of interest and importance to the companies' business. Business entities are characterized by attributes and participate in relationships with other business entities. An attribute is a fact that describes a business entity.

A relationship is an association of business interest between two business entities or between a business entity and itself.

Business entities are identified by keys which can be single attributes or a combination of attributes. Keys published to external systems are denoted as public keys while keys used locally within applications respectively business support systems are denoted as internal keys.

Quite often business entities are stored in relational databases. Business Support System (BSS) applications are acting on these entities and maintaining them in order to fulfill the companies' business processes.

For different business processes it becomes necessary to
- transport all or a subset of related business entities to other databases;
- export them to external systems;
- import them from external systems.

For any kind of export/import business it is needed to transport a set of data, which is either complete in the sense that all references are contained in the set, or which can be completed in the target database by resolving relationships.

Resolving relationships requires rules for identifying business entities and references to other business entities in a generic way.

For this purpose a draft meta-model approach is used. A meta model describes concrete business entities with their identifiers and properties mapped to database tables and columns. It also describes referential relations between the business entities.

Each meta model is written in XML and complies to a specific XML schema. The schema introduces the necessary elements to describe business entities and their relations. The most important of these elements is a so called "business entity part" (bep). A bep has a name and consists out of a collection of attributes. Some of these attributes are flagged as identifiers (or keys).

One bep maps to one table or a subset of rows of one table located in a relational database.

An entity synchronization handler tool (ESH) implements some basic import and export functionality for business entities stored in a relational database.

ESH allows extracting sets of related business entities from a relational database, starting from one or more root entities and following the relationships as described in the meta model. Relationships will be followed iteratively. The iteration will be executed only once in case the relationship is classified as "referencing" (which automatically implies 1:1). The iteration will be executed "unlimited" if the relationship is classified as child relationship (which automatically implies 1:*). The export file generated has XML format as well.

The database tables and rows listed in the meta-model file needs to be available the respective source database.

On the other hand data files complying with a certain meta model can be imported into a relational database, provided the database tables and rows listed in the meta-model file are available in the respective target database.

The rules (relationships) described in the meta-model have to be fulfilled on import as well. First of all, it is determined, whether a business entity (part) already exists in the target database. If a business entity already exists in the target database, either the import is skipped or the business entity is updated with the attributes contained in the import file.

In case a whole set of related business entities are imported, an identification process is executed for each of the entities contained in the set. Internal keys generated for new objects or retrieved from existing objects (to be updated) are propagated following the relationships described in the meta-model.

If a relation between business entities is classified to be "referential", the meta-model driven tool identifies the referenced object either from the import file or from the target database.

If a relation between business entities is classified to be "child", a meta-model driven tool tries to import appropriate child entities from the import file, which means that it executes an update operation on each child entity loaded from the import file, which could be found in the database already and an insert operation on each child entity which could not be identified in the database.

One of the common use cases for entity synchronization via meta-model approach is to establish synchronization between test and production databases. Taking the example of a product catalog with different versions of product offerings the test database will be used to configure and test new versions of product offerings. After verification these new versions need to be published to production.

Problem with the existing solution is the fact that the relations between the business entities are not described in a way which allows to extract a network of related business entities from a source database an insert or update this "network" in a target database while consistently correlating entities from source and target database.

As of today the meta model describes relationships between business entities. These relationships may be of type "referencing (1:1)" or "parent-child (1:n)". Assuming that new versions of a business entity having a "parent-child" relationship has been exported from a source (e.g. test) database this new version needs to be imported into the target (e.g. production) database. During this import it is assured, that not only the root entity is updated, but also the set of children is maintained correctly.

The current schema description and algorithm does not allow for an efficient synchronization.

Business entities and their parts may be identified by "public keys" (either single or composite). These keys never change between database instances and uniquely identify an object (in its domain, not world wide). In addition to the public keys and object might be identified by an internal key, which is a key local to the database instance. If now a business entity is transported to another database instance, the public key of this entity will be used for identification purposes. It will never change while in contrast the internal key might get recalculated depending on the key generation logic of the target database.

The current solution consists out of two parts:
1) several extensions to the meta-model schema which allows to identify business entities and specify "parent/child" relationships and ownership of relations by introducing first and second level business entities
2) a new algorithm which allows to identify first and second level entities based on public keys, generate or retrieve internal identifiers and propagate them in the network of related entities The meta model now distinguishes between first level business entities known to external systems, which are therefore identified by public keys and second level business entities only known as "private collection" of children and identified by their relation to the first level business entity and the collection type.

A "1:n" relationship between business entities can be a relation between first level business entities, between first and second level entities or between second level entities only.

The meta model qualifies the different types of identifiers of a business entity and determines the rules to be applied when a network of business entities is transported to between databases.

Any application implementing the meta-model driven export will be instructed to export one or more first level business entities as identified by a list of public keys. Such an application needs to retrieve the mentioned entities from the database. Then it evaluates the relations described in the meta model and follow all references and child relationships. It needs to retrieve the complete network of related entities according to the rules fined in the meta model. These rules also describe when to "end" the expansion process.

The export file created has XML format and contains the payload of first and second level business entities, just naming the entity types, their attributes and values. Identify the first level business entities of the network by their public keys (single or composite).

An application implementing the meta-model driven import uses a data export file in combination with an associated the meta model file. The tool needs to consider the level of business entities contained in the import file. For 1st level entities and insert or update logic is implemented while for 2nd level entities the complete "private" collection is inserted respectively exchanged with the new content transported in the data set to be imported.

During the import process the following steps have to be executed:
1) build an object model from the data to be imported according to the description in the meta model;
2) identify the first level business entities of the network by their public keys (single or composite) and check whether (a subset of) these entities is already present in the target database;
3) identify the second level entities of the network and check whether (a subset of) these entities is already present in the target database;
4) retrieve internal identifiers for first level entities to be updated and propagate them to the business entities (first and second level) to be imported;
5) create new internal identifiers for first level entities which are not yet available in the target database and will be inserted; propagate these identifiers to the related business entities (first and second level) to be imported;
6) insert or update first level entities;
7) exchange collections of second level entities already existing in the target database with the collections contained in the data set to be imported.

The concept of an aggregation is introduced into the meta-model files and the meta model driven algorithm for import and export:
  The XML schema for the meta model is enhanced to allow the definition of an aggregation relation (private collection) between Beps.
  Beps being part of a private collection are denoted as 2nd level Beps.
  Collections of 2nd level Beps are denoted by qualifying the relationship to these Beps in the meta model with "pchild" referring to "private child".
  The 1st level Bep reached when following the "parent" relationship in the meta model is denoted as "owner" Bep of the private collection.
  If the owning 1st level Bep already exists in the target database, the collection of 2nd level Beps is completely exchanged by the content of the data set to be imported.

If now according to the new concept an aggregation is configured in the meta-model file, it is assumed, that a data set for import contains all "valid" children and all children existing in the database have to be exchanged The algorithm will therefore first search for the parent entity in the database and delete all children, which are available in the database, but not in the import file. Then it will execute an update operation on each child entity loaded from the import file, which could be found in the database already and an insert operation on each child entity which could not be identified in the database. During this operation, new internal identifiers for the objects to be imported will be created.

A further enhancement to the meta model allows to qualify a 1st level Bep with a new flag called "deleteBeforeImport". If this option is specified, the 1st level Bep and its private collections contained in an import file will be deleted from the database and freshly inserted from the import file contents.

Bep Attributes and Keys

The attrib structure described in the schema below represents the attribute of a bep (business entity part). It defines an attribute name and data type, the potential mapping to a database column and gives instructions on handling for export and import.

One of the most important qualifiers is the attribtype, which can be transient or persistent. In case of "persistent", the value of this attribute is imported "as is" into the target database. In case of "transient" the value of this attribute can be created on import, either by any kind of sequence logic or by inheriting the value from the parent. The value of a transient attribute is created in the scope of the target database.

```
<xs:element name="attrib">
    <xs:complexType>
        <xs:attribute default="persistent" name="attribtype">
            <xs:simpleType>
                <xs:restriction base="xs:NMTOKEN">
                    <xs:enumeration value="transient"/>
                    <xs:enumeration value="persistent"/>
                </xs:restriction>
            </xs:simpleType>
        </xs:attribute>
        <xs:attribute name="dbcolumn" type="xs:string" use="required"/>
        <xs:attribute default="N" name="importExportFlag">
            <xs:simpleType>
                <xs:restriction base="xs:NMTOKEN">
                    <xs:enumeration value="Y"/>
                    <xs:enumeration value="N"/>
                </xs:restriction>
            </xs:simpleType>
        </xs:attribute>
        <xs:attribute default="file" name="valueOnImport">
            <xs:simpleType>
                <xs:restriction base="xs:NMTOKEN">
                    <xs:enumeration value="null"/>
                    <xs:enumeration value="default"/>
                    <xs:enumeration value="file"/>
                </xs:restriction>
            </xs:simpleType>
        </xs:attribute>
        <xs:attribute name="tagname" type="xs:string" use="required"/>
        <xs:attribute default="" name="defaultvalue" type="xs:string"/>
        <xs:attribute default="N" name="createIfTransient">
            <xs:simpleType>
                <xs:restriction base="xs:NMTOKEN">
                    <xs:enumeration value="Y"/>
                    <xs:enumeration value="N"/>
                </xs:restriction>
            </xs:simpleType>
        </xs:attribute>
        <xs:attribute default="N" name="version">
            <xs:simpleType>
                <xs:restriction base="xs:NMTOKEN">
                    <xs:enumeration value="Y"/>
                    <xs:enumeration value="N"/>
                </xs:restriction>
            </xs:simpleType>
        </xs:attribute>
        <xs:attribute default="seq" name="createMode">
            <xs:simpleType>
                <xs:restriction base="xs:NMTOKEN">
                    <xs:enumeration value="seq"/>
                    <xs:enumeration value="max"/>
                </xs:restriction>
            </xs:simpleType>
        </xs:attribute>
```

```
                <xs:attribute default="N" name="mandatory">
                    <xs:simpleType>
                        <xs:restriction base="xs:NMTOKEN">
                            <xs:enumeration value="Y"/>
                            <xs:enumeration value="N"/>
                        </xs:restriction>
                    </xs:simpleType>
                </xs:attribute>
                <xs:attribute default="Y" name="update">
                    <xs:simpleType>
                        <xs:restriction base="xs:NMTOKEN">
                            <xs:enumeration value="Y"/>
                            <xs:enumeration value="N"/>
                        </xs:restriction>
                    </xs:simpleType>
                </xs:attribute>
                <xs:attribute default="Y" name="export">
                    <xs:simpleType>
                        <xs:restriction base="xs:NMTOKEN">
                            <xs:enumeration value="Y"/>
                            <xs:enumeration value="N"/>
                        </xs:restriction>
                    </xs:simpleType>
                </xs:attribute>
                <xs:attribute default="N" name="increaseOnUpdate">
                    <xs:simpleType>
                        <xs:restriction base="xs:NMTOKEN">
                            <xs:enumeration value="Y"/>
                            <xs:enumeration value="N"/>
                        </xs:restriction>
                    </xs:simpleType>
                </xs:attribute>
                <xs:attribute default="" name="marker" type="xs:string"/>
                <xs:attribute default="string" name="valuetype">
                    <xs:simpleType>
                        <xs:restriction base="xs:NMTOKEN">
                            <xs:enumeration value="char"/>
                            <xs:enumeration value="numeric"/>
                            <xs:enumeration value="decimal"/>
                            <xs:enumeration value="int"/>
                            <xs:enumeration value="smallint"/>
                            <xs:enumeration value="float"/>
                            <xs:enumeration value="real"/>
                            <xs:enumeration value="double"/>
                            <xs:enumeration value="date"/>
                            <xs:enumeration value="string"/>
                        </xs:restriction>
                    </xs:simpleType>
                </xs:attribute>
                <xs:attribute default="" name="valuelength" type="xs:string"/>
            </xs:complexType>
        </xs:element>
```

Some of the attributes of a Bep play the role of keys. A key is a (named) collection of attribute references.

An attribute reference is just the attribute name as described in schema excerpt below:

```
        <xs:element name="attribref">
            <xs:complexType>
                <xs:attribute name="tagname" type="xs:string" use="required"/>
            </xs:complexType>
        </xs:element>
```

There are public keys which do not change their value for an object instance even if the object is maintained in different databases. Thus they can be used as reliable identification criteria. Internal keys are identifiers which are unique only in the scope of a single database. If an object is transported from one database to another, the internal keys have to be recalculated.

Each bep has an internal key. A key has a unique name and a type, which can be internal, public or mixed. A mixed key is a combination of persistent attributes and transient attributes, where the transient value is inherited from a referenced bep, which in turn has a public key.

```
        <xs:element name="key">
            <xs:complexType>
                <xs:sequence>
                    <xs:element maxOccurs="unbounded" minOccurs="1"
                                ref="attribref"/>
                </xs:sequence>
                <xs:attribute default="internal" name="keytype">
                    <xs:simpleType>
                        <xs:restriction base="xs:NMTOKEN">
                            <xs:enumeration value="internal"/>
                            <xs:enumeration value="public"/>
                            <xs:enumeration value="mixed"/>
                        </xs:restriction>
                    </xs:simpleType>
                </xs:attribute>
                <xs:attribute name="name" type="xs:string" use="required"/>
            </xs:complexType>
        </xs:element>
```

Bep Properties

A new optional bep property called "deleteBeforeImport" has been introduced. This property will be configured in the model file and direct any tool implementing the meta-model driven synchronization logic to apply a different behavior when importing a corresponding entity contained in a data import file.

When such a tool executes an import task, it will try to identify bep instances in the database which are contained in the model file and flagged with "deleteBeforeImport". Then it will physically delete these bep instances and their aggregation from the database before executing the insert of the new bep aggregation contained in the import file.

The new property can be specified in the model file only for beps having public keys defined.

```
        <xs:element name="bep">
            <xs:complexType>
                <xs:sequence>
                    <xs:element maxOccurs="unbounded" minOccurs="1" ref="attrib"/>
                    <xs:element maxOccurs="1" minOccurs="0" ref="discriminator"/>
                    <xs:element maxOccurs="unbounded" minOccurs="1" ref="key"/>
                    <xs:element maxOccurs="1" minOccurs="0" ref="insertOrderBy"/>
                    <xs:element maxOccurs="unbounded" minOccurs="0" ref="bepref"/>
                </xs:sequence>
                <xs:attribute name="dbtable" type="xs:string" use="required"/>
                <xs:attribute name="sequence" type="xs:string"/>
                <xs:attribute default="Full" name="exportMode">
                    <xs:simpleType>
                        <xs:restriction base="xs:NMTOKEN">
                            <xs:enumeration value="Full"/>
                            <xs:enumeration value="Reference"/>
                        </xs:restriction>
                    </xs:simpleType>
                </xs:attribute>
                <xs:attribute name="name" type="xs:string" use="required"/>
```

```
        <xs:attribute default=""
name="conversionRoutine"
                    type="xs:string"/>
        <xs:attribute default=""
name="checkRoutine" type="xs:string"/>
        <xs:attribute default=""
name="versionRoutine" type="xs:string"/>
        <xs:attribute default="persistent"
name="beptype">
            <xs:simpleType>
                <xs:restriction base="xs:NMTOKEN">
                    <xs:enumeration value="transient"/>
                    <xs:enumeration value="persistent"/>
                </xs:restriction>
            </xs:simpleType>
        </xs:attribute>
        <xs:attribute default="N" name="dump">
            <xs:simpleType>
                <xs:restriction base="xs:NMTOKEN">
                    <xs:enumeration value="Y"/>
                    <xs:enumeration value="N"/>
                </xs:restriction>
            </xs:simpleType>
        </xs:attribute>
        <xs:attribute default="N"
name="deleteBeforeImport">
            <xs:simpleType>
                <xs:restriction base="xs:NMTOKEN">
                    <xs:enumeration value="Y"/>
                    <xs:enumeration value="N"/>
                </xs:restriction>
            </xs:simpleType>
        </xs:attribute>
    </xs:complexType>
</xs:element>
```

Aggregation

A new relation type for aggregations has been introduced. This relation type is called "pchild" referring to a private child relationship.

For exporting, a pchild relation will be handled like a child relation between beps. Any tool (e.g. ESH) navigates the model file, expand all child respectively pchild relations and collect the related objects for export. The tool stops expanding relations between beps, if there are no further relations of type child or pchild configured. Relations of type "ref" will be expanded only to the referenced entity.

```
<xs:element name="bepref">
    <xs:complexType>
        <xs:sequence>
            <xs:element maxOccurs="unbounded"
minOccurs="0" ref="attriblnk"/>
        </xs:sequence>
        <xs:attribute name="bepname"
type="xs:string" use="required"/>
        <xs:attribute name="refname"
type="xs:string" use="required"/>
        <xs:attribute default="ref" name="reftype">
            <xs:simpleType>
                <xs:restriction base="xs:NMTOKEN">
                    <xs:enumeration value="ref"/>
                    <xs:enumeration value="child"/>
                    <xs:enumeration value="pchild"/>
                </xs:restriction>
            </xs:simpleType>
        </xs:attribute>
```

```
        <xs:attribute default="N" name="mandatory">
            <xs:simpleType>
                <xs:restriction base="xs:NMTOKEN">
                    <xs:enumeration value="Y"/>
                    <xs:enumeration value="N"/>
                </xs:restriction>
            </xs:simpleType>
        </xs:attribute>
    </xs:complexType>
</xs:element>
```

A reference between beps is described by listing a sequence of attribute which implement the link. The attriblnk element names the attributes from source and target bep referring to each other.

```
<xs:element name="attriblnk">
    <xs:complexType>
        <xs:attribute name="tagname"
type="xs:string" use="required"/>
        <xs:attribute default=""
name="tagnameref" type="xs:string"/>
    </xs:complexType>
</xs:element>
```

Meta-Model Driven Export

The meta model driven export is based on the idea of specifying one or more 1st level business entities (Beps) in a task file. Then the set of entities to be exported will be enriched by all dependent objects, which are references and children, described in the meta model.

Relationships classified as reference will be followed one step deep in order to retrieve the referenced object. Relationships classified as child relationships (either private or public) will be followed in a cascading manner.

The objects are collected in an object repository and finally exported to an XML file.

The meta model allows to exclude certain entities from the export file and include only references via public keys to these object. This reduction of the export file content makes sense in case reference/set-up data, which will never change and therefore does not need to be transported between databases.

The export algorithm is described below and also depicted in Fig. already discussed above.

First of all the export task will be initialized either from an external task file or from an entry in the database. The task file has XML format and lists the 1st level Beps to be exported by specifying the Bep type and the primary keys of the entity, which can be public or private keys. The task file also mentions the meta model file which shall apply to the export. The meta model describing the entities (Beps) and the entity (Bep) network is constructed from the meta model file. An empty object repository is initialized which will be used as staging area for the entities to be exported. The object repository is a set of key/object maps with a map for each Bep type.

Then the 1st level Beps (export candidates) mentioned in export task are retrieved from the database. The Beps are added to the repository and connected to the meta model entities.

Then the process of completing the Bep network by retrieving referenced Beps and child Beps is started. The list of export candidates already inserted into the object repository is processed. For each Bep a completion algorithm is started.

First of all the reference relationships are followed one level deep and the referenced Beps are retrieved from the database and added to the object repository. Then all child relationships are processed. For each relationship the children fitting to a potentially configured filter are retrieved from the database. Each child Bep retrieved from the database will be added to the repository and then cascaded with the same logic as the parent Bep. Cascading the relationships ends if no further child relations are available.

Finally the content of the object repository is dumped to an XML file.

Meta-Model Driven Import

The meta model driven import is driven by the contents of an import file carrying the attributes of Beps and the relationship between these Beps described in a meta model file.

An import can be started in "insert only" mode or in a mixed insert and update mode.

Basic approach is to read the contents of the import file and build an object network according to the relations described in the meta model file. The object network will then be completed by references to objects already contained in the target database. Also an identification process is started based on public key identification which checks for potential existence of the beps to be imported in the target database. Internal keys will be created if necessary or propagated from the entities in the target database. After the object repository has been completed, the insert sequence of entities is determined by evaluating references and child relationships. Then the requested insert and update is executed.

The import algorithm is described below.

First of all the import task will be initialized. The meta model file to be used for the import will be parsed and the meta model describing the Beps with their keys, attributes and relationships among each other is build. An empty Bep repository to be used as staging area is created.

Then the import file is parsed. A Bep object is created according to the meta model specification for each entity listed in the import file. Each entity listed in the import file contains its type together with a list of key/value pairs for the entity attributes and a list of references respectively children identified by their public and internal keys. The attributes in the import file are used to populate the attributes and keys of the Bep as well as the identifiers of references to other beps. Then the Bep is inserted into the object repository.

Now the object network in the repository among the Beps read from the import file is prepared by evaluating the temporary internal keys and public keys of the referenced objects according to meta model specifications.

After this step all Beps in the repository are processed (106) because they need to be completed with information from the database.

First of all the references to other Beps identified by public keys are completed, provided the references objects are not already contained in the object repository. In order to accomplish this, the list of references is looped. If possible, the reference is resolved from the repository, if not the database is accessed. The keys stored in the place holder objects created during import are used to retrieve the referenced objects from the database.

Then the parent/child relationships are established recursively using the "internal" temporary keys from the import file. The temporary "internal" key is considered a transient attribute which will get a new value in the scope of the target database. The values of attributes used to resolve references to a parent are inherited from this parent, they have to have the same value. Due to this the "parent" references in the object network have to be followed and the key value from the referenced parent object is filled.

After processing the parent references, the Bep existence in the database is checked using the public key. If the object exists already the values of the attributes classified as "transient" in the model file (these are the internal keys) are retrieved from the database object and overwrite the corresponding attribute of the Bep in the repository.

If the object exists and has aggregates, these aggregates are deleted before import. If the Bep is flagged to be deleted from the target database before import, this happens now.

If the Bep does not exist in the database yet, the transient Bep attributes are created and filled according to the rules specified in the meta model file, e.g. by drawing the next number from a database sequence.

Then the Bep is added to the list of completed Beps.

Finally after having processed all Beps from the repository, this is checked for consistence before the dump of the repository content to the database is initiated.

The insert order of the Beps is determined by evaluating the dependencies (reference relationships and parent/child relationships) described in the meta model.

All Bep-types listed in the meta model are investigated. First a Bep-type is appended to the end of the insert order. If the Bep has children, the child types are searched in the insert order list. In case a child type is found earlier in the insert order, the Bep-type is removed from the end and inserted before this child type in the insert order.

Then referenced types are reordered before the bep types, they refer to.

In case a cycle reference is detected, an error condition is raised and the import process is stopped. This is considered a defect in the meta model.

Finally the dynamic SQL statements are build which are used to dump the content of the repository to the database.

The last step is then the execution of the insert respectively update statements towards the database.

In the following there will be explained a computing system environment as one example of a suitable computing environment for a system for Meta Model Driven Import and Export of data and is not intended to suggest any limitation as to the scope of use or functionality of the claimed subject matter. Further, the computing environment is not intended to suggest any dependency or requirement relating to the claimed subject matter and any one or combination of components illustrated in the example operating environment.

An example of a device for implementing the previously described innovation includes a general purpose computing device in the form of a computer. Components of computer can include, but are not limited to, a processing unit, a system memory, and a system bus that couples various system components including the system memory to the processing unit. The system bus can be any of several types of bus structures including a memory bus or memory controller, a peripheral bus, and a local bus using any of a variety of bus architectures.

Computer can include a variety of computer readable media. Computer readable media can be any available media that can be accessed by computer. By way of example, and not limitation, computer readable media can comprise computer storage media and communication media. Computer storage media includes volatile and nonvolatile as well as removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer. Communication media can embody computer readable instructions, data structures, program modules or other data in a modulated data signal such as a carrier wave or other transport mechanism and can include any suitable information delivery media.

The system memory can include computer storage media in the form of volatile and/or nonvolatile memory such as read only memory (ROM) and/or random access memory (RAM). A basic input/output system (BIOS), containing the basic routines that help to transfer information between elements within computer, such as during start-up, can be stored in memory. Memory can also contain data and/or program modules that are immediately accessible to and/or presently being operated on by processing unit. By way of non-limiting example, memory 330 can also include an operating system, application programs, other program modules, and program data.

In one embodiment the Interface Unit is a software module loaded in the memory and processable by the processing unit, adapting the system for Meta Model Driven Import and Export of data for receiving or exporting data and the Determination Unit is a software module loaded in the memory and processable by the processing unit adapting the system for Meta Model Driven Import and Export of data for identifying business entities and specify "parent/child" relationships and ownership of relations by introducing first and second level business entities and for identifying first and second level entities based on public keys, generate or retrieve internal identifiers and propagate them in the network of related entities as previously described.

The computer can also include other removable/non-removable and volatile/nonvolatile computer storage media. For example, computer 310 can include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive can be connected to the system bus through a non-removable memory interface such as an interface, and a magnetic disk drive or optical disk drive can be connected to the system bus by a removable memory interface, such as an interface.

A user can enter commands and information into the computer through input devices such as a keyboard or a pointing device such as a mouse, trackball, touch pad, and/or other pointing device. Other input devices can include a microphone, joystick, game pad, satellite dish, scanner, or similar devices. These and/or other input devices can be connected to the processing unit 320 through user input and associated interface(s) that are coupled to the system bus, but can be connected by other interface and bus structures, such as a parallel port, game port or a universal serial bus (USB).

A graphics subsystem can also be connected to the system bus. In addition, a monitor or other type of display device can be connected to the system bus through an interface, such as output interface, which can in turn communicate with video memory. In addition to a monitor, computers can also include other peripheral output devices, such as speakers and/or printing devices, which can also be connected through output interface.

The computer can operate in a networked or distributed environment using logical connections to one or more other remote computers, such as remote server, which can in turn have media capabilities different from device. The remote server can be a personal computer, a server, a router, a network PC, a peer device or other common network node, and/or any other remote media consumption or transmission device, and can include any or all of the elements described above relative to the computer. The logical connection described include a network, such as a local area network (LAN) or a wide area network (WAN), but can also include other networks/buses.

When used in a LAN networking environment, the computer is connected to the LAN through a network interface or adapter. When used in a WAN networking environment, the computer can include a communications component, such as a modem, or other means for establishing communications over a WAN, such as the Internet. A communications component, such as a modem, which can be internal or external, can be connected to the system bus through the user input interface at input and/or other appropriate mechanism.

In a networked environment, program modules depicted relative to the computer, or portions thereof, can be stored in a remote memory storage device. It should be noted that the network connections shown and described are exemplary and other means of establishing a communications link between the computers can be used.

Additionally, it should be noted that as used in this application, terms such as "component," "display," "interface," and other similar terms are intended to refer to a computing device, either hardware, a combination of hardware and software, software, or software in execution as applied to a computing device. For example, a component may be, but is not limited to being, a process running on a processor, a processor, an object, an executable, a thread of execution, a program and a computing device. As an example, both an application running on a computing device and the computing device can be components. One or more components can reside within a process and/or thread of execution and a component can be localized on one computing device and/or distributed between two or more computing devices, and/or communicatively connected modules. Further, it should be noted that as used in this application, terms such as "system user," "user," and similar terms are intended to refer to the person operating the computing device referenced above.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated.

Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various exemplary combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

In some embodiments of the invention an automated model driven approach to business entity replication and synchronization is obtained.

Further, applications capable of reading and interpreting XML can implement a model driven synchronization between business entity instances stored in different relational databases.

In addition, as long as data import files are created according to the meta model description for a set of related business entities, they can be imported from internal and external data sources with clear specification of data mastership of the exporting system.

| Abbreviation/Acronym | Description |
| --- | --- |
| BEP | Business Entity Part |
| ESH | Entity Synchronization Handler |
| BSS | Business Support System |
| XML | eXtended Markup Language |
| XSD | XML Schema Description |

The invention claimed is:

1. A method performed by an apparatus, connected to a source data base and a target data base, said apparatus comprising one or more processors and a memory device having stored computer readable instructions executable by the one or more processors for executing an export process for an automated meta model driven export of entity parts from the source data base, wherein the meta model specifies an abstract model of the source data base and comprises a description of an entity part and/or a reference relationship between entity parts being resolvable from a referencing entity part to a referenced entity part, the method comprising:
   identifying a set of entity parts being identifiable outside the source data base by a public key, an internal key, or a mixture of a public key and an internal key as first level entity parts;
   supplementing the identified set of first level entity parts by a set of second level entity parts being referenced by the first level entity parts according to at least one reference relationship described in the meta model;
   initializing an empty repository as a staging memory for the export process;
   retrieving the identified set of first level entity parts in sequence from the source data base and adding every retrieved first level entity part to the repository;
   linking every added first level entity part to its corresponding meta model description;
   supplementing the repository by:
      scanning the first level entity parts added to the repository;
      resolving, for every scanned first level entity part, its reference relationships in a recursive manner to identify related child entity parts;
      evaluating, for every child entity part, whether it is already added to the repository;
   adding every child entity part to the repository when it is not yet added; and
   dumping content of the repository into an export file.

2. The method of claim 1, further comprising a step of defining the export process as a task file storing a list of identifiers of first level entity parts and a reference to a meta model file describing the meta model which is applicable to the export process.

3. The method of claim 1, wherein the reference relationship in the meta model is selectable as a 1:1 reference being resolvable from a referencing entity part of the source data base to one referenced entity part of the source data base or a 1:n child reference being resolvable from a referencing entity part of the source data base to at least one referenced entity part of the source data base, and wherein
   the resolving, for every scanned first level entity part, its reference relationships in a recursive manner to identify related child entity parts is executed such that a 1:1 reference is resolved over one level of hierarchy and such that a 1:n child reference is resolved over at least one level of hierarchy.

4. The method of claim 1, wherein the repository comprises a map of keys and related data for every entity part type and the step of adding an entity part to the repository is executed by:
identifying an entity part type of the entity part;
identifying the map corresponding to the identified entity part type or creating a new map to cover the identified entity part type when it is added for the first time to the repository; and
entering the keys and related data into the identified or the newly created map.

5. The method of claim 4, wherein the entity part data of a referenced child entity part comprises at least a reference to a parent entity part referencing the child entity part.

6. The method of claim 1, further comprising the step of applying a filter reflecting entity part conditions prior to the addition of an entity part to the repository such that the entity part is added to the repository when its entity part conditions fit the filter.

7. The method of claim 1, further comprising the step of excluding at least one predetermined entity part from the export file and including only a public key to the entity part into the export file.

8. A method performed by an apparatus, connected to a source data base and a target data base, said apparatus comprising one or more processors and a memory device having stored computer readable instructions executable by the one or more processors for executing an import process for an automated meta model driven import of entity parts from the source data base to the target data base, wherein the automated meta model specifies an abstract model of the source data base or the target data base and comprises at least a description of an entity part and/or a private child reference being resolvable from a parent entity part of the source data base or the target data base which is identifiable outside the source data base or the target data base by a public key, wherein the resolution is to at least one referenced entity part of the source data base or the target data base and is identifiable only internally in the source data base or the target data base, and wherein the private child reference is used to override a pre-existing aggregation of entity parts in the target data base being referenced from an entity part of the target data base having the same public key as the parent entity part in the source data base, the method comprising:
parsing an import file to build an initial graph of entity parts according to the meta model in a repository as staging memory for data import into the target data base;
transforming the initial graph in the repository into an import graph of entity parts, said transforming comprising:
identifying a next entity part in the initial graph being identifiable outside the source data base by a public key as next first level source entity part;
searching the target data base for an entity part which has a public key corresponding to the public key of the next first level source entity part as next first level target entity part;
deleting entity parts being referenced by the next first level target entity part in the target data base when the referenced entity parts are identifiable internally in the target data base and a private child reference of the meta model indicates that such entity parts are to be deleted in the target data base prior to data import;
completing the next first level target entity part and its referenced entity parts with data from the target data base, said completing comprising:
resolving public references of the next first level target entity part from the repository or from the target data base;
resolving 1:1 references of the next first level target entity part;
proceeding recursively with the resolution of public references and 1:1 references from the next first level target entity part to its referenced entity parts;
propagating references being identifiable internally in the target data base and corresponding to transient references parsed from the import file from the target data base into the import graph;
creating an import sequence for entity parts in the import graph in accordance with types of references according to a rule that child entity parts follow parent entity parts;
reordering the import sequence such that the entity parts which are referenced are listed prior to entity parts referencing entity parts; and
updating the target data base on the basis of the import graph of entity parts.

9. The method of claim 8, wherein
the meta model further specifies a 1:1 reference being resolvable from a referencing entity part of the source data base or the target data base to one referenced entity part of the source data base or the target data base, or a 1:n child reference being resolvable from a referencing entity part of the source data base or the target data base to at least two referenced entity part of the source data base or the target data base, and
references are differentiated as public references or transient references being changeable upon import into the target data base.

10. The method of claim 8, wherein the step of transforming the initial graph further comprises the step of creating internal keys for entity parts to be newly imported into the target data base.

11. The method of claim 8, wherein each entity part in the initial graph is characterized by entity type, at least one attribute, and a list of references to other entity parts or children and the step of completing the initial graph further comprises the step of creating transient attributes for entity parts being newly inserted to the target data base and filling the transient attributes according to rules specified in the meta model.

12. The method of claim 8, wherein the step of updating the target data base on the basis of the import graph comprises the steps of creating database statements modeling the import graph for subsequent storage thereof in the target data base.

13. An apparatus connected to a source data base and a target data base, said apparatus comprising one or more processors and a memory device having stored computer readable instructions executable by the one or more processors for executing an export process according to an automated meta model driven export of entity parts from the source data base, wherein said one or more processors are configured to:
manage a meta model specifying an abstract model of the source data base and comprising a description of an entity part and/or a reference relationship between entity parts being resolvable from a referencing entity part to a referenced entity part;

identify a set of entity parts being identifiable outside the source data base by a public key, an internal key, or a mixed public and internal key as first level entity parts;

supplement the identified set of first level entity parts by a set of second level entity parts being referenced by the first level entity parts according to at least one reference relationship described in the meta model;

initialize an empty repository as a staging memory for the export process;

retrieve the identified set of first level entity parts in sequence from the source data base;

add each of the retrieved first level entity parts to the repository;

link the each added first level entity parts to its corresponding meta model description;

supplement the repository memory with export data;

scan the first level entity parts added to the repository memory;

resolve, for every scanned first level entity part, its reference relationships in a recursive manner to identify related child entity parts;

evaluate, for every child entity part, whether it is already added to the repository memory and to add every child entity part to the repository memory when it is not added; and dump content of the repository memory into an export file.

14. The apparatus of claim 13, wherein the one or more processors are further configured to read a task file defining the export process through a list of identifiers of entity parts and through a reference to a meta model file describing the meta model which is applicable to the export process.

15. The apparatus of claim 13, wherein the reference relationship in the meta model is a 1:1 reference being resolvable from a referencing entity part of the source data base to one referenced entity part of the source data base or a 1:n child reference being resolvable from a referencing entity part of the source data base to at least one referenced entity part of the source data base, and wherein the one or more processors are further configured to resolve, for every scanned first level entity part, its reference relationships in a recursive manner to identify related child entity parts such that a 1:1 reference is resolved over one level of hierarchy and such that a 1:n child reference is resolved over at least one level of hierarchy.

16. The apparatus of claim 13, wherein the repository memory stores a map of keys and related data for every entity part type and the one or more processors are further configured to:

identify an entity part type of the entity part;

identify the map corresponding to the identified entity part type or to create a new map to cover the identified entity part type when it is added for the first time to the repository memory; and enter the keys and related data into the identified or the newly created map.

17. The apparatus of claim 15, wherein the one or more processors are further configured to apply a filter reflecting entity part conditions prior to the addition of an entity part to the repository memory such that the entity part is added to the repository memory when its entity part conditions fit the filter.

18. The apparatus of claim 15, wherein the one or more processors are further configured to exclude at least one predetermined entity part from the export file and including only a public key to the entity part into the export file.

19. An apparatus connected to a source data base and a target data base, said apparatus comprising one or more processors and a memory device having stored computer readable instructions executable by the one or more processors for executing an import process for an automated meta model driven import of entity parts from the source data base to the target data base, wherein the automated meta model specifies an abstract model of the source data base or the target data base and comprises a description of an entity part and/or a private child reference being resolvable from a parent entity part of the source data base or the target data base which is identifiable outside the source data base or the target data base by a public key, wherein the resolution is to at least one referenced entity part of the source data base or the target data base and is identifiable internally in the source data base or the target data base, and wherein the private child reference is used to override a pre-existing aggregation of entity parts in the target data base being referenced from an entity part of the target data base having the same public key as the parent entity part in the source data base, wherein the one or more processors are configured to:

parse an import file to build an initial graph of entity parts according to the meta model in a repository as staging memory for data import into the target data base;

transform the initial graph in the repository into an import graph of entity parts by performing the steps of:

identifying a next entity part in the initial graph being identifiable outside the source data base by a public key as next first level source entity part;

searching the target data base for an entity part which has a public key corresponding to the public key of the next first level source entity part as next first level target entity part;

deleting entity parts being referenced by the next first level target entity part in the target data base when the referenced entity parts are identifiable internally in the target data base and a private child reference of the meta model indicates that such entity parts are to be deleted in the target data base prior to data import;

completing the next first level target entity part and its referenced entity parts with data from the target data base by performing the steps of:

resolving public references of the next first level target entity part from the repository or from the target data base;

resolving 1:1 references of the next first level target entity part;

proceeding recursively with the resolution of public references and 1:1 references from the next first level target entity part to its referenced entity parts;

propagating references being identifiable internally in the target data base and corresponding to transient references parsed from the import file from the target data base into the import graph;

creating an import sequence for entity parts in the import graph in accordance with types of references according to a rule that child entity parts follow parent entity parts;

reordering the import sequence such that the entity parts which are referenced are listed prior to entity parts referencing entity parts; and update the target data base on the basis of the import graph of entity parts.

20. The apparatus of claim 19, wherein the meta model further specifies a 1:1 reference being resolvable from a referencing entity part of the source data base or the target data base to one referenced entity part of the source data base or the target data base, or a 1:n child reference being resolvable from a referencing entity part of the source data base or the target data base to at least one referenced entity part of the source data base or the target data base, and references are differentiated as public references or transient references being changeable upon import into the target data base.

21. The apparatus of claim 19, wherein the one or more processors are further configured to create internal keys for entity parts to be newly imported into the target data base.

22. The apparatus of claim 21, wherein each entity part in the initial graph is characterized by entity type, at least one attribute, and a list of references to other entity part or children and the one or more processors are further configured to create transient attributes for entity parts being newly inserted to the target data base and to fill the transient attributes according to rules specified in the meta model.

23. The apparatus of claim 19, wherein the one or more processors are further configured to create database statements modeling the import graph for subsequent storage thereof in the target data base.

* * * * *